US012243513B2

(12) United States Patent
Zhu et al.

(10) Patent No.: US 12,243,513 B2
(45) Date of Patent: Mar. 4, 2025

(54) GENERATION OF OPTIMIZED SPOKEN LANGUAGE UNDERSTANDING MODEL THROUGH JOINT TRAINING WITH INTEGRATED ACOUSTIC KNOWLEDGE-SPEECH MODULE

(71) Applicant: MICROSOFT TECHNOLOGY LICENSING, LLC, Redmond, WA (US)

(72) Inventors: Chenguang Zhu, Sammamish, WA (US); Nanshan Zeng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 17/323,847

(22) Filed: May 18, 2021

(65) Prior Publication Data
US 2022/0230629 A1  Jul. 21, 2022

Related U.S. Application Data

(60) Provisional application No. 63/205,646, filed on Jan. 20, 2021.

(51) Int. Cl.
*G10L 15/06* (2013.01)
*G06F 40/279* (2020.01)
(Continued)

(52) U.S. Cl.
CPC .......... *G10L 15/063* (2013.01); *G06F 40/279* (2020.01); *G10L 13/08* (2013.01);
(Continued)

(58) Field of Classification Search
CPC ....... G10L 15/063; G10L 13/08; G10L 15/02; G10L 15/1815; G10L 15/22;
(Continued)

(56) References Cited

U.S. PATENT DOCUMENTS

| 10,388,274 B1 | 8/2019 | Hoffmeister |
| 2015/0309992 A1 | 10/2015 | Visel |

(Continued)

FOREIGN PATENT DOCUMENTS

WO    2016196320 A1    12/2016

OTHER PUBLICATIONS

Zhang, Yuyu, et al. "Variational Reasoning for Question Answering with Knowledge Graph." arXiv preprint arXiv:1709.04071 (2017), pp. 1-22 (Year: 2017).*

(Continued)

*Primary Examiner* — Jesse S Pullias
*Assistant Examiner* — Michael C. Lee
(74) *Attorney, Agent, or Firm* — Workman Nydegger

(57) ABSTRACT

A speech module is joint trained with a knowledge module by transforming a first knowledge graph into an acoustic knowledge graph. The knowledge module is trained on the acoustic knowledge graph. Then, the knowledge module is integrated with the speech module to generate an integrated knowledge-speech module. In some instances, the speech module included in the integrated knowledge-speech module is aligned with a language module to generate an optimized speech model configured to leverage acoustic information and acoustic-based knowledge information, along with language information.

14 Claims, 14 Drawing Sheets

(51) Int. Cl.
- G10L 13/08 (2013.01)
- G10L 15/02 (2006.01)
- G10L 15/18 (2013.01)
- G10L 15/22 (2006.01)

(52) U.S. Cl.
CPC .......... *G10L 15/02* (2013.01); *G10L 15/1815* (2013.01); *G10L 15/22* (2013.01)

(58) Field of Classification Search
CPC ... G10L 15/1822; G10L 13/00; G06F 40/279; G06F 40/30; G06N 3/045; G06N 3/088; G06N 5/02

See application file for complete search history.

(56) References Cited

U.S. PATENT DOCUMENTS

| | | | | |
|---|---|---|---|---|
| 2015/0332672 | A1* | 11/2015 | Akbacak | G06F 16/3329 704/257 |
| 2019/0005951 | A1 | 1/2019 | Kang et al. | |
| 2019/0147367 | A1* | 5/2019 | Bellamy | G06N 20/00 706/12 |
| 2019/0244611 | A1* | 8/2019 | Godambe | G10L 15/22 |
| 2020/0342853 | A1 | 10/2020 | Ji et al. | |
| 2021/0312906 | A1* | 10/2021 | Kuo | G10L 15/1822 |
| 2022/0044671 | A1* | 2/2022 | Kapoor | G10L 15/063 |
| 2022/0122622 | A1* | 4/2022 | Narayanan | G10L 25/30 |
| 2022/0230625 | A1 | 7/2022 | Zhu et al. | |
| 2022/0230628 | A1 | 7/2022 | Zhu et al. | |

OTHER PUBLICATIONS

Gemmeke, Jort F., et al. "Audio set: An ontology and human-labeled dataset for audio events." 2017 IEEE international conference on acoustics, speech and signal processing (ICASSP) (2017), pp. 776-780 (Year: 2017).*

Chuang, Yung-Sung, et al. "SpeechBERT: An audio-and-text jointly learned language model for end-to-end spoken question answering." arXiv preprint arXiv:1910.11559 (2019), pp. 1-6 (Year: 2019).*

Sun, Tianxiang, et al. "CoLAKE: Contextualized language and knowledge embedding." arXiv preprint arXiv:2010.00309 (2020), pp. 1-11 (Year: 2020).*

Pruksachatkun, Yada, et al. "Intermediate-task transfer learning with pretrained models for natural language understanding: When and why does it work?." arXiv preprint arXiv:2005.00628 (2020), pp. 1-17 (Year: 2020).*

Narayanan, Arun, et al. "Cascaded encoders for unifying streaming and non-streaming ASR." arXiv preprint arXiv:2010.14606 (2020), pp. 1-5 (Year: 2020).*

Song, Meina, Wet al. "KGAnet: a knowledge graph attention network for enhancing natural language inference." Neural Computing and Applications 32 (2020), pp. 14963-14973 (Year: 2020).*

Fu, Xiaoyi, et al. "A speech-to-knowledge-graph construction system." Proceedings of the Twenty-Ninth International Conference on International Joint Conferences on Artificial Intelligence. (Jan. 7, 2021), pp. 5303-5305 (Year: 2021).*

Tang, Zhiyuan, et al. "Collaborative joint training with multitask recurrent model for speech and speaker recognition." IEEE/ACM Transactions on Audio, Speech, and Language Processing 25.3 (2016): pp. 493-504. (Year: 2016).*

Definition of "module" in the Free On-Line Dictionary of Computing, available at https://foldoc.org/module (last updated Oct. 27, 1997). (Year: 1997).*

Vegupatti, Mani, et al. "Simple Question Answering Over a Domain-Specific Knowledge Graph using BERT by Transfer Learning." AICS. 2020, pp. 1-12 (Year: 2020).*

Kumar, et al., "A Knowledge Graph Based Speech Interface for Question Answering Systems", In Proceedings of Speech Communication, vol. 92, Sep. 1, 2017, 12 Pages.

"Non Final Office Action Issued in U.S. Appl. No. 17/323,854", Mailed Date: Dec. 13, 2022, 77 Pages. (MS# 409334-US-NP).

Zhu, et al., "SDNet: Contextualized Attention-based Deep Network for Conversational Question Answering", In Repository of arXiv:1812.03593v4, Dec. 19, 2018, pp. 1-8.

Ba, et al., "Layer Normalization", In Repository of arXiv:1607.06450, Jul. 21, 2016, 14 Pages.

Baevski, et al., "VQ-WAV2VEC: SELF-Supervised Learning of Discrete Speech Representations", In Proceedings of Eighth International Conference on Learning Representations, Apr. 26, 2020, 12 pages.

Bhargava, et al., "Easy Contextual Intent Prediction and Slot Detection", In Proceedings of International Conference on Acoustics, Speech and Signal Processing, May 26, 2013, pp. 8337-8341.

Bordes, et al., "Translating Embeddings for Modeling Multi-Relational Data", In Proceedings of the 26th International Conference on Neural Information Processing Systems, vol. 2, Dec. 5, 2013, 9 Pages.

Brown, et al., "Language Models are Few-Shot Learners", In Repository of arXiv:2005.14165, May 28, 2020, 72 Pages.

Calhoun, et al., "The NXT-format Switchboard Corpus: A rich resource for investigating the syntax, semantics, pragmatics and prosody of dialogue", In Language Resources and Evaluation, Dec. 2010, pp. 387-419.

Chen, et al., "Spoken language understanding without speech recognition", In IEEE International Conference on Acoustics, Speech and Signal Processing, Apr. 15, 2018, 5 Pages.

Chuang, et al., "SpeechBERT: Cross-modal pre-trained language model for end-to-end spoken question answering", In International Speech Communication Association, Oct. 25, 2020, 5 Pages.

Chuang,, et al., "SpeechBERT: An Audio-and-text Jointly Learned Language Model for End-to-end Spoken Question Answering", In Repository arXiv preprint arXiv:1910.11559, Aug. 11, 2020, 6 Pages.

Chuing, et al., "Generative pre-training for speech with autoregressive predictive coding", In Proceedings of IEEE International Conference on Acoustics, Speech and Signal Processing (ICASSP), May 4, 2020, pp. 3497-3501.

Chung, et al., "An unsupervised autoregressive model for speech representation learning", In Proceedings of The 20th Annual Conference of the International Speech Communication Association, Sep. 15, 2019, pp. 146-150.

Chung, et al., "Vector-quantized autoregressive predictive coding", In International Speech Communication Association, Oct. 25, 2020, pp. 3760-3764.

Chung,, et al., "Semi-Supervised Speech-Language Joint Pre-Training for Spoken Language Understanding", In Repository of arXiv:2010.02295v1, Oct. 5, 2020, 10 Pages.

Denisov, et al., "Pretrained semantic speech embeddings for end-to-end spoken language understanding via cross-modal teacher-student learning", In International Speech Communication Association, Oct. 25, 2020, 5 Pages.

Devlin, et al., "BERT: Pre-training of Deep Bidirectional Transformers for Language Understanding", In Proceedings of the Conference of the North American Chapter of the Association for Computational Linguistics: Human language Technologies, Jun. 2, 2019, pp. 4171-4186.

Devlin, et al., "BERT: Pre-training of Deep Bidirectional Transformers for Language Understanding", In Repository of arXiv:1810.04805v1, Oct. 11, 2018, 14 Pages.

Ding, et al., "Cognitive graph for multi-hop reading comprehension at scale", In Repository of arXiv:1905.05460v2, Jun. 4, 2019, 10 Pages.

Dong, et al., "Unified Language Model Pre-training for Natural Language Understanding and Generation", In Proceedings of 33rd Conference on Neural Information Processing Systems, Dec. 8, 2019, pp. 1-13.

Duran, et al., "Probabilistic word association for dialogue act classification with recurrent neural networks", In Engineering Applications of Neural Networks, Sep. 3, 2018, pp. 1-12.

Fevry, et al., "Entitles as experts: Sparse memory access with entity supervision", In Repository of arXiv:2004.07202v2, Oct. 6, 2020, 15 Pages.

(56) References Cited

OTHER PUBLICATIONS

Gao, et al., "Fewrel 2.0: Towards more challenging few-shot relation classification", In Repository of arXiv:1910.07124v1, Oct. 16, 2019, 6 pages.
Ghosal, et al., "Contextual inter-modal attention for multi-modal sentiment analysis", In Proceedings of the Conference on Empirical Methods in Natural Language Processing, Oct. 31, 2018, pp. 3454-3466.
Gorman, et al., "Prosodylab-aligner: A tool for forced alignment of laboratory speech", In Journal of the Canadian Acoustical Association, vol. 39, Issue 3, Sep. 2011, 3 Pages.
Guu, et al., "Realm: Retrieval-augmented language model pre-training", In Repository of arXiv:2002.08909v1, Feb. 10, 2020, 12 pages.
Haghani, et al., "From audio to semantics: Approaches to end-to-end spoken language understanding", In Proceedings of IEEE Spoken Language Technology Workshop (SLT), Dec. 18, 2018, pp. 720-726.
Hamilton, et al., "Inductive representation learning on large graphs", In Journal of Advances in neural information processing systems, Dec. 4, 2017, pp. 1-11.
Han, et al., "Fewrel: A large-scale supervised few-shot relation classification dataset with state-of-the-art evaluation", In Repository of arXiv:1810.10147, Oct. 26, 2018, 7 Pages.
Kalinowski,, et al., "A Survey of Embedding Space Alignment Methods for Language and Knowledge Graphs", In Repository of arXiv preprint arXiv:2010.13688, Oct. 26, 2020, 27 Pages.
Lee, et al., "ODSQA: Opendomain spoken question answering dataset", In Proceedings of IEEE Spoken Language Technology Workshop (SLT), Dec. 2018, 8 Pages.
Levine, et al., "Sensebert: Driving some sense into bert", In Repository of arXiv:1908.05646v1, Aug. 15, 2019, 10 Pages.
Lewis, et al., "BART: Denoising sequence-to-sequence pre-training for natural language generation, translation, and comprehension", In Proceedings of the 58th Annual Meeting of the Association for Computational Linguistics, Jul. 2020, pp. 7871-7880.
Li, et al., "Spoken Squad: A study of mitigating the impact of speech recognition errors on listening comprehension", In 19th Annual Conference of the International Speech Communication Association, Sep. 2, 2018, pp. 3459-3463.
Ling, et al., "Deep contextualized acoustic representations for semi-supervised speech recognition", In IEEE International Conference on Acoustics, Speech and Signal Processing, May 4, 2020, pp. 6429-6433.
Liu, et al., "K-bert: Enabling language representation with knowledge graph", In Proceedings of The Thirty-Fourth AAAI Conference on Artificial Intelligence, Feb. 7, 2020, 8 Pages.
Liu, et al., "Linguistic knowledge and transferability of contextual representations", In Repository of arXiv:1903.08855v1, Mar. 21, 2019, 22 Pages.
Liu, et al., "Mockingjay: Unsupervised speech representation learning with deep bidirectional transformer encoders", In IEEE International Conference on Acoustics, Speech and Signal Processing, May 4, 2020, pp. 6419-6423.
Liu, et al., "Roberta: A Robustly Optimized BERT Pretraining Approach", In Repository of arXiv:1907.11692, Jul. 26, 2019, 13 Pages.
Loshchilov, et al., "Decoupled weight decay regularization", In Proceedings of the 7th International Conference on Learning Representations, Sep. 28, 2018, pp. 1-18.
Lugosch, et al., "Speech model pre-training for end-to-end spoken language understanding", In Proceedings of the 20th Annual Conference of the International Speech Communication Association, Sep. 15, 2019, pp. 814-818.
Lv, et al., "Graph-based reasoning over heterogeneous external knowledge for commonsense question answering", In Proceedings of The Thirty-Fourth AAAI Conference on Artificial Intelligence, Apr. 2020, pp. 8449-8456.

Mori, et al., "Spoken Language Understanding: Systems for Extracting Semantic Information from Speech", In Publication of John Wiley and Sons, Apr. 25, 2011, 3 Pages.
Oord, et al., "Representation learning with contrastive predictive coding", In Repository of arXiv:1807.03748v1, Jul. 10, 2018, pp. 1-13.
Panayotov, et al., "Librispeech: an Asr Corpus Based on Public Domain Audio Books", In Proceedings of IEEE International Conference on Acoustics, Speech and Signal Processing, Apr. 19, 2015, pp. 5206-5210.
Park, et al., "SpecAugment: A simple data augmentation method for automatic speech recognition", In Proceedings of The 20th Annual Conference of the International Speech Communication Association, Sep. 15, 2019, pp. 2613-2617.
"International Search Report and Written Opinion Issued in PCT Application No. PCT/US21/062518", Mailed Date: Apr. 20, 2022, 10 Pages. (MS# 409308-WO-PCT).
"International Search Report and Written Opinion Issued in PCT Application No. PCT/US21/062723", Mailed Date: Apr. 4, 2022, 10 Pages. (MS# 409334-WO-PCT).
"International Search Report and Written Opinion Issued in PCT Application No. PCT/US21/063940", Mailed Date: Apr. 13, 2022, 11 Pages. (MS# 409116-WO-PCT).
Peters, et al., "Deep contextualized word representations", In Repository of arXiv:1802.05365v2, Mar. 22, 2018, 15 Pages.
Peters, et al., "Knowledge enhanced contextual word representations", In Proceedings of the Conference on Empirical Methods in Natural Language Processing and the 9th International Joint Conference on Natural Language Processing, Nov. 3, 2019, 14 Pages.
Poerner, et al., "Bert is not a knowledge base (yet): Factual knowledge vs. name-based reasoning in unsupervised qa", In Repository of arXiv:1911.03681v1, Nov. 9, 2019. 7 Pages.
Qian, et al., "Exploring ASR-free end-to-end modeling to improve spoken language understanding in a cloud-based dialog system", In Proceedings of IEEE Automatic Speech Recognition and Understanding Workshop, Dec. 16, 2017, 9 Pages.
Radford, et al., "Improving Language Understanding by Generative Pre-training", Retrieved From: https://www.cs.ubc.ca/~amuham01/LING530/papers/radford2018improving.pdf, Jun. 11, 2018, 12 Pages.
Radford, et al., "Language Models are Unsupervised Multitask Learners", In Journal of OpenAI Blog, vol. 1, Issue 8, Feb. 24, 2019, 24 Pages.
Rajpurkar, et al., "SQUAD: 100,000+ Questions for Machine Comprehension of Text", In Proceedings of the 2016 Conference on Empirical Methods in Natural Language Processing, Nov. 1, 2016, pp. 2383-2392.
Rao, et al., "Speech To Semantics: Improve ASR and NLU Jointly via All-Neural Interfaces", In Repository of arXiv:2008.06173v1, Aug. 14, 2020, 5 Pages.
Ravuri, et al., "Recurrent Neural Network and LSTM Models for Lexical Utterance Classification", In Proceedings of 16th Annual Conference of the International Speech Communication Association, Sep. 6, 2015, 5 Pages.
Ringgaard, et al., "Sling: A framework for frame semantic parsing", In Repository of arXiv:1710.07032v1, Oct. 19, 2017, 9 Pages.
Riviere, et al., "Unsupervised pretraining transfers well across languages", In Proceedings of IEEE International Conference on Acoustics, Speech and Signal Processing (ICASSP), May 4, 2020, pp. 7414-7418.
Schneider, et al., "wav2vec: Unsupervised pre-training for speech recognition", In Proceedings of The 20th Annual Conference of the International Speech Communication Association, Sep. 15, 2019, pp. 3465-3469.
Serdyuk, et al., "Towards end-to-end spoken language understanding", In IEEE International Conference on Acoustics, Speech and Signal Processing (ICASSP), Apr. 15, 2018, pp. 5754-5758.
Shen, et al., "Exploiting structured knowledge in text via graph-guided representation learning", In Repository of arXiv:2004.14224v1, Apr. 19, 2020, pp. 1-19.
Soares, et al., "Matching the blanks: Distributional similarity for relation learning", In Repository of arXiv:1906.03158v1, Jun. 7, 2019, 10 Pages.

(56) References Cited

OTHER PUBLICATIONS

Song, et al., "Speech-XLNet: Unsupervised Acoustic Model Pretraining For Self-Attention Networks", In International Speech Communication Association, Oct. 25, 2020, pp. 3765-3769.
Sun, et al., "ERNIE: Enhanced Representation through Knowledge Integration", In Journal of arXiv preprint arXiv:1904.09223v1, Apr. 19, 2019, 8 Pages.
Sun, et al., "Open domain question answering using early fusion of knowledge bases and text", In Repository of arXiv:1809.00782v1, Sep. 4, 2018, 12 pages.
Sun, et al., "Pullnet: Open domain question answering with iterative retrieval on knowledge bases and text", In Repository of arXiv:1904.09537v1, Apr. 21, 2019, 11 Pages.
Talmor, et al., "olmpics-on what language model pre-training captures", In Repository of arXiv:1912.13283v1, Dec. 31, 2019, 15 Pages.
Vashishth, et al., "Composition-based multirelational graph convolutional networks", In Repository of arXiv:1911.03082v1, Nov. 8, 2019, pp. 1-14.
Vaswani, et al., "Attention is All You Need", In Proceedings of 31st Conference on Neural Information Processing Systems, Dec. 4, 2017, pp. 1-11.
Velikovic, et al., "Graph Attention Networks", In Repository of arXiv:1710.10903, Oct. 30, 2017, pp. 1-11.
Verga, et al., "Facts as experts: Adaptable and interpretable neural memory over symbolic knowledge", In Repository of arXiv:2007.00849v1, Jul. 2, 2020, 12 pages.
Vrandecic, "Wikidata: a free collaborative knowledgebase", In Journal of Communications of the ACM, vol. 57, Issue 10, Sep. 2014, pp. 78-85.
Wang, et al., "Deep graph library: Towards efficient and scalable deep learning on graphs", In Repository of arXiv:1909.01315v1, Sep. 3, 2019, pp. 1-7.
Wang, et al., "Kepler: A unified model for knowledge embedding and pre-trained language representation", In Repository of arXiv:1911.06136v1, Nov. 13, 2019, 10 Pages.
Wang, et al., "Unsupervised pre-training of bidirectional speech encoders via masked reconstruction", In Proceedings of IEEE International Conference on Acoustics, Speech and Signal Processing (ICASSP), May 4, 2020, pp. 6889-6893.
Wolf, et al., "Transformers: State-of-the-Art Natural Language Processing", In Repository of arXiv:1910.03771v1, Oct. 9, 2019, pp. 1-11.
Xiong, et al., "Pretrained encyclopedia: Weakly supervised knowledge-pretrained language model", In Repository of arXiv:1912.09637v1, Dec. 20, 2019, pp. 1-13.
Yang, et al., "XLNet: Generalized Autoregressive Pretraining for Language Understanding", In Proceedings of 33rd Conference on Neural Information Processing Systems, Dec. 8, 2019, 11 Pages.
YU,, et al., "JAKET: Joint Pre-training of Knowledge Graph and Language Understanding", In Repository of arXiv:2010.00796v1, Oct. 2020, 11 Pages.
Zadeh, et al., "Multimodal language analysis in the wild: CMU-MOSEI dataset and interpretable dynamic fusion graph", In Proceedings of the 56th Annual Meeting of the Association for Computational Linguistics (vol. 1: Long Papers), Jul. 2018, pp. 2236-2246.
Zhang, et al., "BERTScore: Evaluating text generation with BERT", In Proceedings of Eighth International Conference on Learning Representations, Apr. 26, 2020, pp. 1-43.
Zhang, et al., "ERNIE: Enhanced Language Representation with Informative Entities", In Repository of arXiv:1905.07129, Jun. 4, 2019, 11 Pages.
Zhang, et al., "Semantics-aware BERT for Language Understanding", In Proceedings of the AAAI Conference on Artificial Intelligence, vol. 34, Issue 05, Apr. 2020, 8 Pages.
Zhang, et al., "Variational reasoning for question answering with knowledge graph", In Repository of arXiv:1709.04071v5, Nov. 27, 2017, pp. 1-22.
Zhu, et al., "Make lead bias in your favor: A simple and effective method for news summarization", In Repository of arXiv:1912.11602v1, Dec. 25, 2019, 7 Pages.
"Notice of Allowance Issued in U.S. Appl. No. 17/323,854", Mailed Date: Jun. 23, 2023, 9 Pages. (MS# 409334-US-NP).
"Non Final Office Action issued in U.S. Appl. No. 17/323,561", Mailed Date: Mar. 15, 2023, 24 Pages. (MS#409116-US-NP).
Bhattacharjee, et al., "To BERT or Not to BERT: Comparing Task-specific and Task-agnostic Semi-Supervised Approaches for Sequence Tagging", In Repository of arXiv:2010.14042v1, Oct. 27, 2020, 8 Pages.
Do, et al., "Cross-Lingual Phone Mapping for Large Vocabulary Speech Recognition of Under-Resourced Languages", In Journal of IEICE Transactions on Information and Systems, vol. 97, Issue 2, Feb. 1, 2014, pp. 285-295.
Hsu, et al., "Unsupervised Domain Adaptation for Robust Speech Recognition via Variational Autoencoder-based Data Augmentation", In Proceedings of IEEE Automatic Speech Recognition and Understanding Workshop, Dec. 16, 2017, pp. 16-23.
Hsuan, et al., "Spoken SQuAD: A Study of Mitigating the Impact of Speech Recognition Errors on Listening Comprehension", In Repository of arXiv:1804.00320v1, Apr. 1, 2018, 5 Pages.
Jin, et al., "Relation of the Relations: A New Paradigm of the Relation Extraction Problem", In Repository of arXiv:2006.03719v1, Jun. 5, 2020, 11 Pages.
Nathani, et al., "Learning Attention-based Embeddings for Relation Prediction in Knowledge Graphs", In Proceedings of the 57th Annual Meeting of the Association for Computational Linguistics, Jul. 28, 2019, pp. 4710-4723.
Peters, et al., "Knowledge Enhanced Contextual Word Representations", In Repository of arXiv:1909.04164v1, Sep. 9, 2019, 14 Pages.
Tsunoo, et al., "Towards Online End-to-end Transformer Automatic Speech Recognition", In Repository of arXiv:1910.11871v1, Oct. 25, 2019, 5 Pages.
U.S. Appl. No. 63/205,647, filed Jan. 20, 2021.
U.S. Appl. No. 63/205,646, filed Jan. 20, 2021.
U.S. Appl. No. 63/205,645, filed Jan. 20, 2021.
U.S. Appl. No. 17/323,561, filed May 18, 2021.
U.S. Appl. No. 17/323,854, filed May 18, 2021.
Final Office Action mailed on Dec. 8, 2023, in U.S. Appl. No. 17/323,561 (MS# 409116-US02), 18 Pages.
Non-Final Office Action mailed on Jun. 21, 2024, in U.S. Appl. No. 17/323,561, (MS#409116-US02), 19 pages.

* cited by examiner

GENERATION OF OPTIMIZED SPOKEN LANGUAGE UNDERSTANDING MODEL THROUGH JOINT TRAINING WITH INTEGRATED ACOUSTIC KNOWLEDGE-SPEECH MODULE

CROSS-REFERENCE TO RELATED APPLICATIONS

This application claims the benefit of and priority to U.S. Provisional Patent Application Ser. No. 63/205,646 filed on Jan. 20, 2021 and entitled "GENERATION OF OPTIMIZED SPOKEN LANGUAGE UNDERSTANDING MODEL THROUGH JOINT TRAINING WITH INTEGRATED ACOUSTIC KNOWLEDGE-SPEECH MODULE," which application is expressly incorporated herein by reference in its entirety.

BACKGROUND

Spoken language understanding (SLU) tackles the problem of comprehending audio signals and making predictions related to the content. SLU has been employed in various areas such as intent understanding, question answering and sentiment analysis. Early approaches leveraged a two-step pipeline, e.g., using automatic speech recognition (ASR) to transcribe input audio into text, and then employ language understanding models to produce results. However, this cascaded architecture has several drawbacks. First, the transcription produced by the ASR module often contains errors, which adversely affects the prediction accuracy. Second, even if the transcription is perfect, the rich prosodic information (e.g., tempo, pitch, intonation) is lost after the ASR transcription. Humans often leverage this information to better understand and disambiguate the content of a speech utterance, therefore this loss of information is great detriment to machine learning understanding of speech utterances.

Furthermore, conventional language models are typically trained on a large-scale unlabeled corpus of data to conduct self-supervised training. Such language models are able to perform various natural language processing tasks such as characterizing linguistic patterns from text sources to generate context-aware representations. However, these models struggle to grasp world knowledge, concepts, and relationships which are very important in language understanding. For example, a language model may require between tens and hundreds of instances of a phrase (e.g., "a Labrador is a kind of dog") in its training corpus before being able to learn the relationship between the noun "Labrador" and the noun "dog".

While some efforts have been made to integrate knowledge-based data into language model training, most approaches combine token representations in the language model with representations of the knowledge-based data. Because the knowledge-based data is typically pre-computed from an external source, the embeddings may not easily align with the language representations space or cannot be directly learned as model parameters. This causes over-parameterization which will halt the model training process. Furthermore, the model is unable to adapt to a new knowledge domain without undergoing the entire training process from the beginning.

In view of the foregoing, there is an ongoing need for improved systems and methods for generating training data and training models, including the deployment of such models, for improved spoken language understanding.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Disclosed embodiments are directed to embodiments for joint training a speech module with a knowledge module for natural language understanding by training a knowledge module with acoustic-based knowledge graphs.

Some embodiments include systems and methods for obtaining a first knowledge graph comprising a set of entities and a set of relations between two or more entities included in the set of entities. The first knowledge graph is then transformed into an acoustic knowledge graph. The acoustic knowledge graph comprises acoustic data corresponding to each entity of the set of entities and each relation of the set of relations between entities. Subsequently, a set of acoustic features is extracted from the acoustic knowledge graph.

The computing system also trains a knowledge module on the set of acoustic features to generate knowledge-based entity representations for the acoustic knowledge graph. Additionally, a speech module is pre-trained on a training data set comprising unlabeled speech data to understand acoustic information from speech transcriptions. Finally, an integrated knowledge-speech module is generated to perform semantic analysis on audio data by integrating the knowledge module with the speech module.

In some embodiments, the speech module included in the integrated knowledge-speech module is aligned with a language module. The speech module is an optimized speech model configured to leverage knowledge, language and acoustic information learned during the training, alignment and integration processes. Some embodiments are also directed to a computing system configured to obtain electronic content comprising a set of audio data, operate the integrated knowledge-speech module and perform semantic analysis on the set of audio data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments are directed towards embodiments for generating optimized speech models, integrated knowledge-speech modules, integrated knowledge-language modules, and performing semantic analysis on various modalities of electronic content containing natural language.

Figure 1:
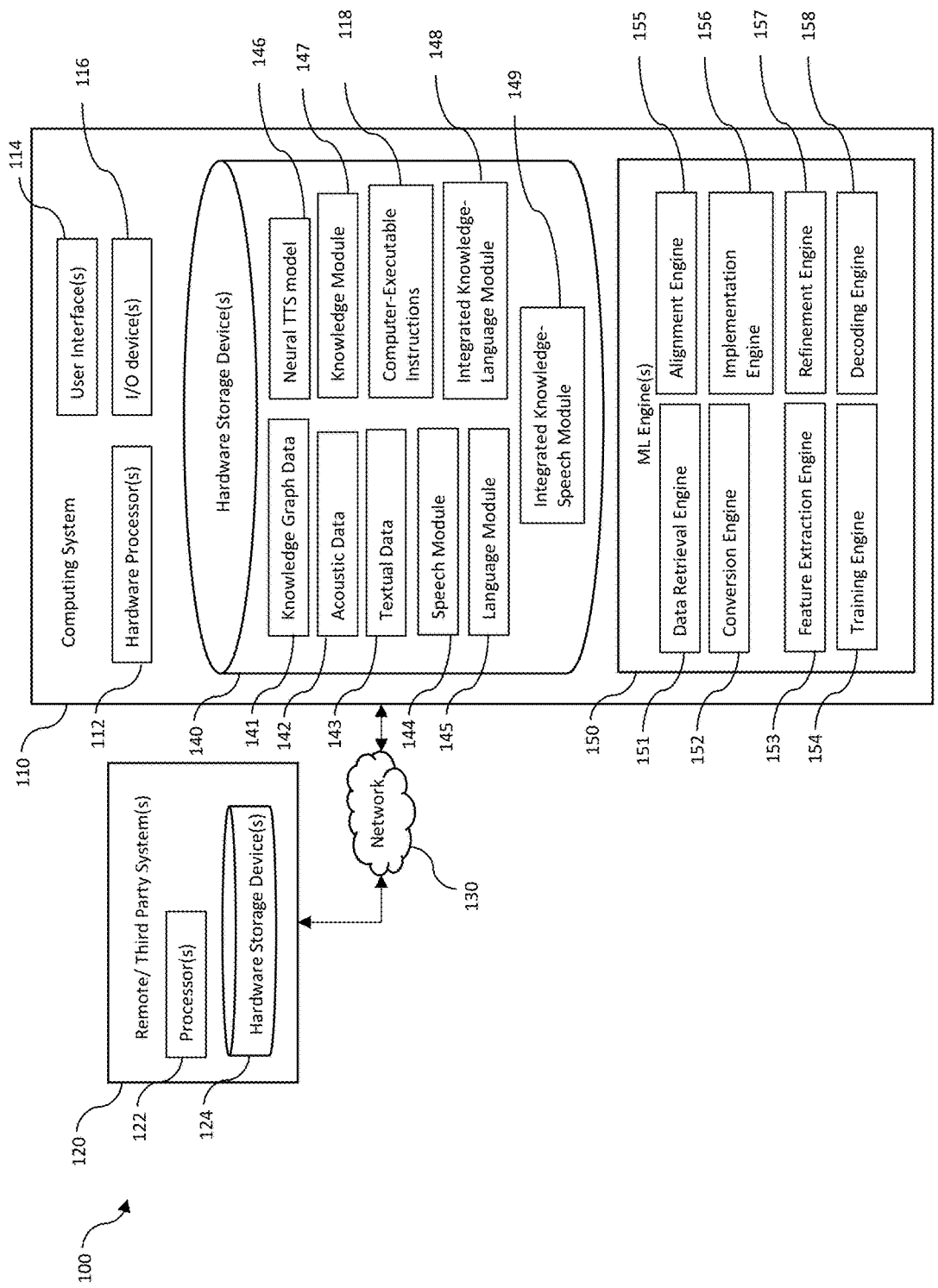
FIG. 1 illustrates a computing environment in which a computing system incorporates and/or is utilized to perform disclosed aspects of the disclosed embodiments. The illustrated computing system is configured for optimized speech model and language model generation and machine learning model training and includes hardware storage device(s) and a plurality of machine learning engines. The computing system is in communication with remote/third-party system(s) 120.

Attention will now be directed to FIG. 1, which illustrates components of a computing system 110 which may include and/or be used to implement aspects of the disclosed invention. As shown, the computing system includes a plurality of machine learning (ML) engines, models, and data types associated with inputs and outputs of the machine learning engines and models.

Attention will be first directed to FIG. 1, which illustrates the computing system 110 as part of a computing environment 100 that also includes remote/third party system(s) 120 in communication (via a network 130) with the computing system 110. The computing system 110 is configured to train a plurality of machine learning models for speech recognition, natural language understanding, text-to-speech (TTS), and more particularly, training machine learning models to generate an integrated knowledge-language module, an integrated knowledge-speech module and/or an optimized speech model. The computing system 110 is also configured to generate training data configured for training machine learning models. Additionally, or alternatively, the computing system is configured to operate a trained machine learning model for performing semantic analysis on audio data, audio-visual data, textual data, video data, image data, or other electronic data comprising natural language utterances.

The computing system 110, for example, includes one or more processor(s) 112 (such as one or more hardware processor(s)) and a storage (i.e., hardware storage device(s) 140) storing computer-executable instructions 118 wherein one or more of the hardware storage device(s) 140 is able to house any number of data types and any number of computer-executable instructions 118 by which the computing system 110 is configured to implement one or more aspects of the disclosed embodiments when the computer-executable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, in some embodiments, a distributed storage that is distributed to several separate and sometimes remote and/or third-party system(s) 120. The computing system 110 can also comprise a distributed system, in some embodiments, with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The hardware storage device(s) 140 are configured to store the different knowledge graph data 141, acoustic data 142, textual data 143, speech module (or speech model) 144, language module (or language model) 145, neural TTS model 146, knowledge module 147, integrated knowledge-language module 148 and integrated knowledge-speech module 149 described herein.

The storage (e.g., hardware storage device(s) 140) includes computer-executable instructions 118 for instantiating or executing one or more of the models and/or engines shown in computing system 110. The models are configured as machine learning models or machine learned models, such as deep learning models and/or algorithms. In some instances, the one or more models are configured as engines or processing systems (e.g., computing systems integrated within computing system 110), wherein each engine (i.e., model) comprises one or more processors (e.g., hardware processor(s) 112) and computer-executable instructions 118 corresponding to the computing system 110.

The knowledge graph data 141 comprises one or more knowledge graphs as described herein. Acoustic data 142 comprises electronic content/data obtained from a speaker or a source comprising one or more speakers or a source comprising one or more speakers, background noise, non-human speakers and/or machine speakers. In some instances, the acoustic data 142 comprise(s) audio data and/or audio-visual data. Additionally, or alternatively, the acoustic data 142 comprise metadata (i.e., attributes, information, speaker identifiers, etc.) corresponding to the particular source from which the data is collected. In some embodiments, the metadata comprises attributes associated with the identity of the speaker, characteristics of the acoustic data and/or a speaker's voice and/or information about where, when and/or how the acoustic data is obtained.

In some embodiments, the acoustic data 142 is raw data, wherein the acoustic data is recorded in real time from a target speaker, or a set of target speakers. The acoustic data 142 comprises processed data (e.g., waveform format of the audio data corresponding to one or more target speaker or comprising natural language data). For example, speech data (i.e., audio data) is extracted from previously recorded audio files and/or video files such as speech recognized by speech recognition models. In such instances, speech recognition models collect and store speech data from a speaker through authorized third-party applications, such as personal assistant devices, auditory search queries, recorded audio messages, and general conversation recognized by the speech recognition model.

This data can be aggregated over time for a specific application, across many applications, for a specific device, and/or across all of the user's devices. In some embodiments, applications include web, mobile, and/or desktop applications. The referenced devices comprise speech-enabled devices such as, but not limited to, personal assistant devices, audio-enabled speakers, mobile phones, smart devices, internet-of-things (IoT) devices, laptops, and/or any device capable of listening, recognizing and recording natural speech data from particular and/or multiple speakers.

Textual data 143 comprises electronic content/data obtained from one or more sources comprising text-based natural language utterances. The textual data 143 comprise(s) text data and/or visual data including images comprising textual data and/or transcription data. The textual data 143 also comprises metadata (i.e., attributes, information, speaker identifiers, etc.) corresponding to the particular source from which the data is collected. The metadata/attributes reflect and/or are usable to identify the identity of a speaker from which the text data is transcribed, characteristics of the textual data 143 and/or information about where, when and/or how the textual data 143 is obtained.

In some embodiments, a computing system has access to a plurality of different applications such as word processing, email, document creation, document consumption, proof reading, wherein the computing system is able to extract text content from these applications and/or read text aloud to capture TTS data via the neural TTS model. The textual data 143 are computer generated text from a language model or natural language generator. In some instances, the textual data 143 are extracted from third party sources such as newspapers, articles, books, and/or other public sources. In some instances, the textual data 143 are authored by a particular user. In some instances, the textual data 143 are extracted from within a particular application and/or content associated with a particular application, such as a media slideshow application, an email application, a calendar application, a document creator, a spreadsheet application, etc.

In some embodiments, the acoustic data 142 and/or textual data 143 is collected and stored as part of a usage log. The usage log collects speech data from a single application. The user authorizes the usage log stores data from multiple sources and/or applications. For example, a user is able to authorize the storage and use of data collected from a virtual personal assistant application such as Cortana. In such instances, the user speaks to the virtual personal assistant to do web searches, email searches, send text messages, send emails, and other speech-enabled queries and actions. As the user continues to use virtual assistant, more and more speech data is collected and added into the usage log. This data can then be used as training data to train a speech module or a neural TTS model.

The hardware storage device(s) 140 store(s) the neural TTS model 146, which is configured as a neural network that is trainable or is trained to convert input text to speech data. For example, a portion of an email containing one or more sentences (e.g., a particular number of machine-recognizable words) is applied to the neural TTS model, wherein the model is able to recognize words or parts of words (e.g., phonemes) and is trained to produce a corresponding sound to the phonemes or words. The neural TTS model 146 is also adaptable for a particular target speaker. For example, target speaker data (e.g., acoustic data 142 and/or knowledge graph data 141) comprising audio data including spoken words and/or phrases obtained and/or recorded from a target speaker. An example of a neural TTS model 800 is described in more detail below with reference to FIG. 8.

In some embodiments, the neural TTS model 146 is speaker independent, meaning that it produces arbitrary speech data based on one or a combination of target speaker datasets. In some embodiments, the neural TTS model 146 is a multi-speaker neural network, meaning that the model is configured to produce speech data corresponding to a plurality of discrete speakers/speaker profiles. In some embodiments, the neural TTS model 146 is speaker dependent, meaning that the model is configured to produce synthesized speech data primarily for a particular target speaker.

The knowledge graph data 141, acoustic data 142 and/or textual data 143 is sometimes formatted as training data, wherein the speech module 144, language module 145 and/or neural TTS model 146 is trained (or pre-trained) on the training data.

In some embodiments, the neural TTS model 146 is further trained and/or adapted such that the model is trained on training data comprising and/or based on a combination of natural speech data and synthesized speech data, such that the neural TTS model 146 is configured to produce speech data in the personalized voice of the target speaker or enterprise-specific voice of a particular entity. The synthesized speech data comprises personal content from a user generated by the neural TTS model 146, including narrated power-point slides, narrated word documents, narrated emails in the user's personalized voice or another voice the user has access to, or other text-based files that can be narrated to consumed auditorily by the user or authorized third-party such an enterprise or commercial consumers/customers.

The neural TTS model 146 is configured to convert a text-based knowledge graph into an acoustic-based knowledge graph by converting each text-based node (entity) or node connection (entity relation) into an acoustic-based node (entity) or node connection (entity relation).

The hardware storage device(s) 140 is also configured to store an integrated knowledge-language module 148 and an integrated knowledge-speech module 149. In some instances, the integrated knowledge-language module 148 is generated by integrating knowledge module 147 with language module 145. In some instances, the integrated knowledge-speech module 149 is generated by integrating knowledge module 147 and speech module 144.

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, a conversion engine 152, a feature extraction engine 153, a training engine 154, an alignment engine 155, an implementation engine 156, a refinement engine 157 or a decoding engine 158 which are individually and/or collectively configured to implement the different functionality described herein.

For example, the data retrieval engine 151 is configured to locate and access data sources, databases, and/or storage devices comprising one or more data types from which the data retrieval engine 151 can extract sets or subsets of data to be used as training data. The data retrieval engine 151 receives data from the databases and/or hardware storage devices, wherein the data retrieval engine 151 is configured to reformat or otherwise augment the received data to be used as training data. Additionally, or alternatively, the data retrieval engine 151 is in communication with one or more remote/third-party systems (e.g., remote/third party system(s) 120) comprising remote/third party datasets and/or data sources. In some instances, these data sources comprise audiovisual services that record speech, text, images, and/or video.

The data retrieval engine 151 accesses electronic content comprising knowledge graph data 141, acoustic data 142, textual data 143 and/or other types of audio-visual data including video data, image data, holographic data, 3-D image data, etc. The data retrieval engine 151 is a smart engine that is able to learn optimal dataset extraction processes to provide a sufficient amount of data in a timely manner as well as retrieve data that is most applicable to the desired applications for which the machine learning models/engines will be trained. For example, the data retrieval engine 151 can learn which databases and/or datasets will generate training data that will train a model (e.g., for a specific query or specific task) to increase accuracy, efficiency, and efficacy of that model in the desired natural language understanding application.

The data retrieval engine 151 locates, selects, and/or stores raw recorded source data (e.g., natural speech data), wherein the data retrieval engine 151 is in communication with one or more other ML engine(s) and/or models included in computing system 110 (e.g., conversion engine 152, feature extraction engine 153, training engine 154, etc.). In such instances, the other engines in communication with the data retrieval engine 151 are able to receive data that has been retrieved (i.e., extracted, pulled, etc.) from one or more data sources such that the received data is further augmented and/or applied to downstream processes. For example, in some embodiments, the data retrieval engine 151 is in communication with the refinement engine 157.

The conversion engine 152 is configure for converting data types including in the training data obtained by the data retrieval engine 151. For example, in some instances the conversion engine 152 is configured to convert a text-based knowledge graph to an acoustic-based knowledge graph or an audio-visual based knowledge graph. The conversion engine 152 is configured/configurable to convert knowledge graph data 141 into entity-specific or enterprise-specific knowledge graph data. The conversion engine 152 is also configured to convert acoustic data 142 from one speaker's voice to another speaker's voice. In some embodiments, the conversion engine 152 is configured to convert knowledge graph data 141, acoustic data 142 and/or textual data 143 from one language to a second language. (See FIG. 11).

The feature extraction engine 153 is configured for extracting acoustic data and/or other acoustic information from electronic content, knowledge graph features from knowledge graph data 141, acoustic and/or textual features from speech utterances, and a set of acoustic features from an acoustic knowledge graph.

The training engine 154 is in communication with one or more of the data retrieval engine 151, the conversion engine 152, the feature extraction engine 153 or the implementation engine 156. In such embodiments, the training engine 154 is configured to receive one or more sets of training data from the data retrieval engine 151. After receiving training data relevant to a particular application or task, the training engine 154 trains one or more models on the training data for the particular natural language understanding applications, speech recognition applications, speech generation applications, and/or personalized voice applications. In some embodiments, the training engine 154 is configured to train a model via unsupervised training or supervised training.

The training engine 154 is configured to pre-train or train the neural TTS model 146, the speech module 144, the language module 145 and/or the knowledge module 147. The training engine 154 is configured to train a model (e.g., a neural TTS model 146, see also neural TTS model 800 of FIG. 8) with training data (e.g., natural speech data) such that the machine learning model is configured to generate speech from arbitrary text as according to embodiments described herein. In some embodiments, the training engine 154 is configured such that the system is configured to use personalized audio to train a personalized speech recognition system to improve accuracy of the speech recognition.

The training engine 154 is also configured to train a speech module to detect understand audio-based natural language. In some embodiments, the training engine 154 is configured to train a language module to detect and understand text-based natural language and perform semantic analysis, to train the knowledge module 147 to detect and understand entities and entity relationships included in a knowledge graph (e.g., knowledge graph data 141), and to perform integrated training of the speech module 144 concurrently with the language module 145.

It will be appreciated that the term "train", as used herein, refers to training, pre-training, and/or post-training a machine learning or machine learned model and that the terms "training," "pre-training" and "post-training" can be viewed as interchangeable. Training typically refers to the process of configuring a model for a particular task, by applying training data to the model being trained. The process of training a model is a sequential process that involves exposing the machine learning model to different training data while confirming or rejecting characterizations of the training data.

In terms of sequential training operations, pre-training occurs prior to training and training occurs prior to post-training. During each sequential phase of training, the model may be exposed to new and different training data. In some embodiments, a model is "pre-trained" before a further training operation, such as joint training with another model or integration with another model. The terms associated with training a model may also refer to the processes of adapting, tuning, optimizing and/or otherwise modifying a model that has already undergone at least some training, by further integrating the model with another model and/or by joint training the model with interdependent training data from another model.

The computing system 110 includes an alignment engine 155 that is configured to align one or more machine learning models to generate an optimized or integrated machine model. The alignment engine 155 is configured to integrate a knowledge module 147 and a speech module 144 to generate an integrated knowledge-speech module. The alignment engine 155 is also configured to integrate a knowledge module 147 and a language module 145 to generate an integrated knowledge-language module and to align a speech module and a language module by aligning the output embeddings from both modules into a shared semantic space.

The foregoing integrations of models is used to generate an optimized speech model is generated leverages both acoustic and contextual natural language understanding. The alignment engine 155 is also configured/configurable to align an initial knowledge graph to one or more secondary or custom knowledge graphs and/or to align the language module included in the integrated knowledge-language module 148 with a pre-trained speech module (e.g., speech module 144).

In some embodiments, the computing system 110 includes an implementation engine 156 in communication with any one of the models and/or ML engine(s) 150 (or all of the models/engines) included in the computing system 110 such that the implementation engine 156 is configured to implement, initiate or run one or more functions of the plurality of ML engine(s) 150. In one example, the implementation engine 156 is configured to operate the data retrieval engines 151 so that the data retrieval engine 151 retrieves data at the appropriate time to be able to generate training data for the training engine 154.

The implementation engine 156 facilitates the process communication and timing of communication between one or more of the ML engine(s) 150 and is configured to implement and operate an optimized speech model and/or an integrated knowledge-speech module and/or an integrated knowledge-language module to perform one or more natural language understanding tasks.

For instance, at run-time, the computing system obtains electronic content comprising audio data and/or audio-visual data (see data retrieval engine 151), extracts acoustic data from the electronic content (see feature extraction engine 153), accesses an optimized speech model that is generated by aligning a speech module with a language module in such a way as to leverage acoustic information and language information in natural language processing tasks (see alignment engine 155), the speech module having been trained on a training data set comprising unlabeled acoustic data to understand acoustic information from speech utterances, the language module having been trained on a different training data set comprising unlabeled text data to understand semantic information from text-based transcripts (see training engine 154) and having been integrated with a knowledge module to perform semantic analysis (see alignment engine 155), and operates the optimized speech model to perform natural language processing on the acoustic data and generate an understanding of the extracted acoustic data (see implementation engine 156).

During run-time, the computing system is able to operate the speech model to understand the acoustic data extracted from the electronic content, comprising speech, and by performing speech to text natural language processing and to generate text output based on the understanding of the extracted acoustic data. The system is also able to operate the optimized speech model to understand the acoustic data extracted from the electronic content, comprising a spoken question, by generating and outputting an answer as output to the spoken question.

The computing system 110 also includes a refinement engine 157. The refinement engine 157 is in communication with the training engine and is configured to refine a machine learning model by adapting the model component (or sub-model) to a target speaker, an acoustic based knowledge graph, an enterprise entity, or other specialization.

In some embodiments, the computing system 110 includes a decoding engine 158 (or an encoding-decoding engine) configured to encode and decode data. The decoder is neural network that takes the feature map, vector and/or tensor from an encoder and generates a best match to the intended input. Here, the encoding/decoding engine 158 is also configured to encode input data and decode the encoding to convert the input data into an output embedding in the same or different semantic space.

The computing system is in communication with remote/third party system(s) 120 comprising one or more processor(s) 122 and one or more computer-executable instruction(s) 124. It is anticipated that, in some instances, the remote/third party system(s) 120 further comprise databases housing data that could be used as training data, for example, external speaker data. Additionally, or alternatively, the remote/third party system(s) 120 include machine learning systems external to the computing system 110. In some embodiments, the remote/third party system(s) 120 are software programs or applications.

Figure 2:
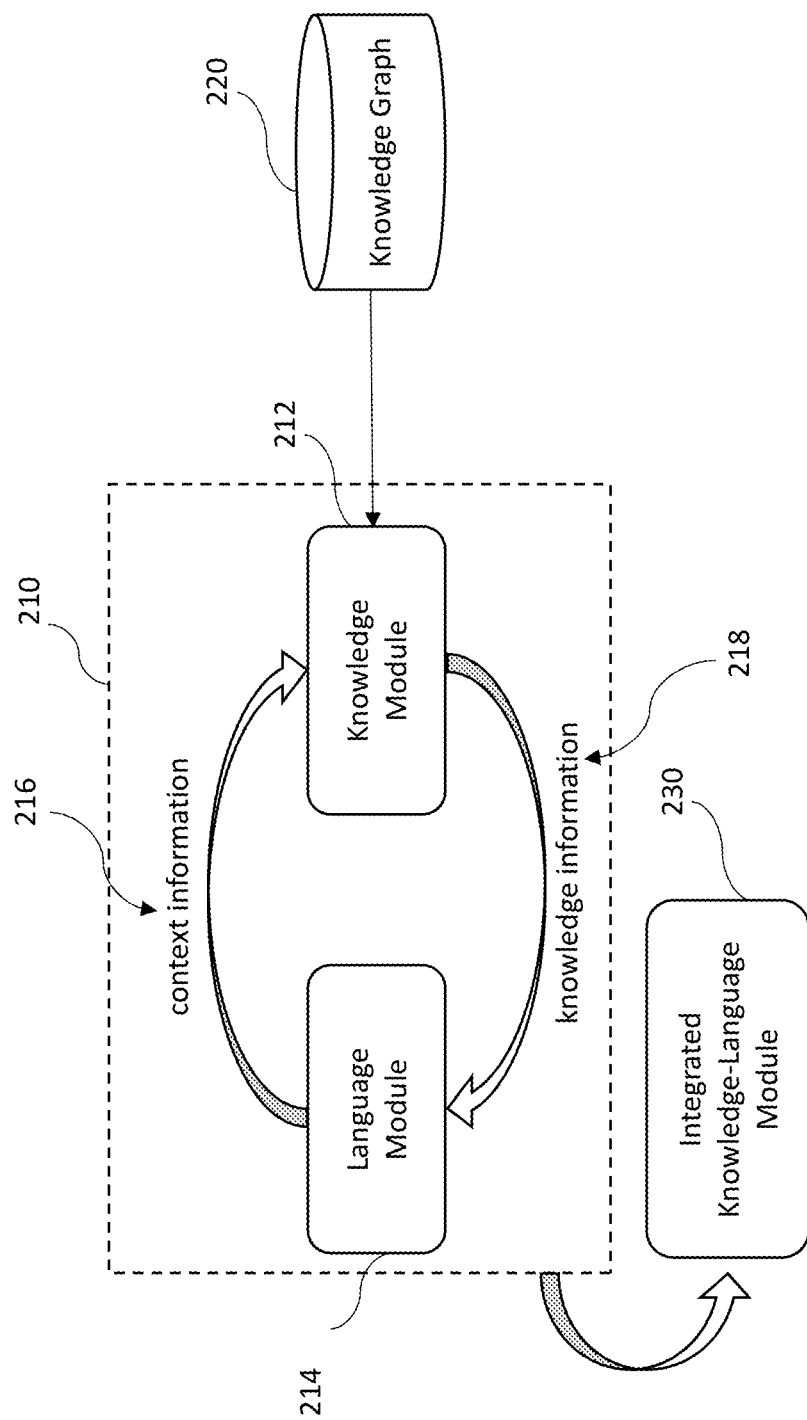
FIG. 2 illustrates one embodiment of a process flow diagram for training a machine learning model to generate an integrated knowledge-language module.

Attention will now be directed to FIG. 2, which illustrates one embodiment of a process flow diagram for training and integrating a language module 214 and a knowledge module 212 to generate an integrated language knowledge module 230. As shown in the figure, the knowledge module 212 is trained on one or more knowledge graphs (e.g., knowledge graph 220). Knowledge Information 218 output from the knowledge module 212 is applied to the language module 214, which in turn provides context information 216 to applied to the language module 214.

The language module 214 is pre-trained on textual data to understand semantics of text-based natural language utterances. Additionally, context information 216 obtained from the language module 214 is applied to the knowledge module 212.

The knowledge graph 220 comprises information about world knowledge, entities, and relations, wherein the knowledge graph 220 is configured to act as a supplement to an existing pre-trained language model (e.g., language module 214). By integrating the knowledge module 212 and the language module 214, each module provides essential information to mutually assist each other in their respective tasks. For example, the knowledge module 212 produces embeddings for entities in text (e.g., knowledge information 218) while the language module generates context-aware initial embeddings for entities and relations in the graph (e.g., context information 216).

Such embodiments beneficially enable a pre-trained model to easily adapt to unseen knowledge graphs in new domains. The knowledge module 212 leverages a graph attention network to provide structure-aware entity embeddings for language modeling, meaning the embeddings represent the entities of the knowledge graph as well as the relationships between the nodes (e.g., the embeddings are aware of the structure of the knowledge graph).

The language module 214 produces contextual representations as initial embeddings for knowledge graph entities and relations given their descriptive text. Thus, in both modules, content understanding is based on related knowledge and contextual understanding. Referred to as joint-training in some instances, the integration or joint-training of the knowledge module 212 and the language module 214 enables the projection of the entities/relations included in the knowledge graph (e.g., knowledge graph data 141) and text (e.g., textual data 143) into a shared semantic latent space. As the knowledge module 212 produces representations from descriptive text, it solves the over-parameterization issue that can arise because entity embeddings are no longer part of the initial knowledge module's parameters.

A further benefit of the disclosed embodiments includes the ability to easily adapt to unseen knowledge graphs in the refinement phase (e.g., as carried out by the refinement engine 157). As the initial embeddings of entities and relations come from their descriptive text, the joint-training and/or integration of the modules is not confined to any fixed knowledge graph. With the learned ability to integrate structural information during pre-training, the framework is extensible to novel knowledge graphs with previously unseen entities and relations.

Figure 3:
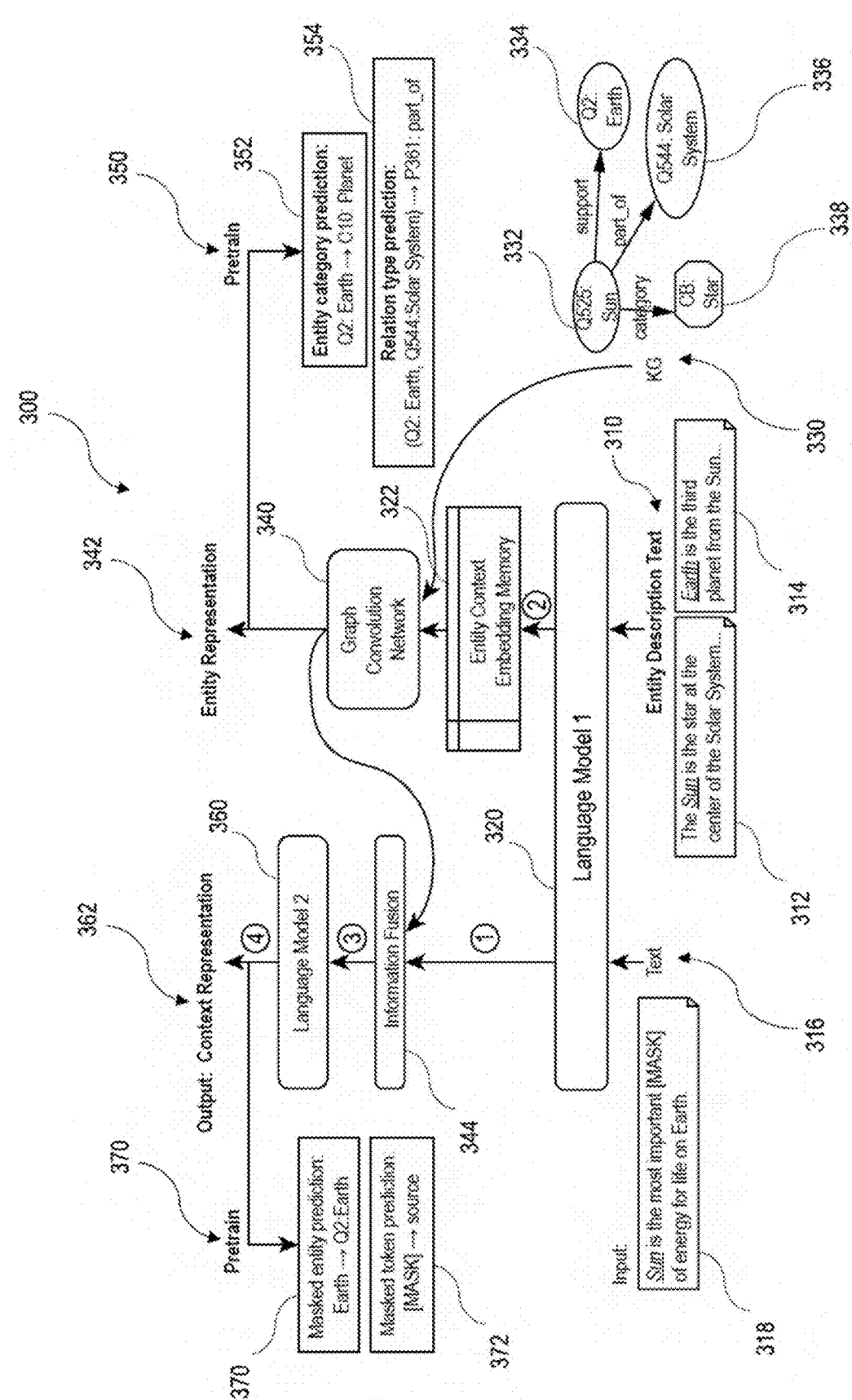
FIG. 3 illustrates one embodiment of a process flow diagram for training and generating an integrated knowledge-language module according to embodiments disclosed herein.

Attention will now be directed to FIG. 3, which illustrates one example embodiment of a process flow diagram for training and integrating a knowledge module and a multi-layer language module to generate an integrated knowledge-language module 300. In order to solve the cyclic dependency between the two modules, some embodiments comprise a multi-layer language model (e.g., a first language module 320 and a second language module 360) where the first language module provides embeddings (see embeddings at locations 1 and 2) for both the second language module 360 and a knowledge module configured as a graph convolution network 340. The entity embeddings (e.g., entity representation 342) from the knowledge module are also fed into the second language module (see information fusion 344), which produces the final representation (e.g., context representation 362).

In some embodiments, the first language module 320 and the second language module are formed as the first several transformer layers and the rest layers of a pre-trained language model (e.g., as initialized from BERT or RoBERTA).

A knowledge graph (KG) 330 is shown having a set of entities (e.g., Sun 332, Earth 334, Solar System 336, Star 338) and. set of relations between at least two of the entities (e.g., support, part_of, category). Thus, the knowledge graph 330 is formed from a plurality of head-relation-tail triplets (e.g., [Sun 332]-[support]-[Earth 334], [Sun 332]-[part_of]-[Solar System 336], [Sun 322]-[category]-[Star 338]).

As entities in the knowledge graph are represented by nodes without context, some embodiments utilize entity description text 310 to describe the concept and meaning of the entities. For each entity, its description text describes the entity (e.g., "The Sun is the star at the center of the solar system" 312 and "Earth is the third planet from the Sun" 314). I When there are multiple mentions of an entity in its description text, the first mention is the one used during training. Similarly, relations can be further described by relation description text.

The pre-training tasks (e.g., pretrain 350) are any combination of self-supervised, supervised and/or pseudo-supervised training tasks. The pre-training tasks include entity category classification/prediction 352, where an entity is masked, and the module is tasked with predicting the missing or masked entity and/or relation type prediction 354 for the knowledge module wherein a relation between at least two entities is masked and the module is tasked with predicting a relation type.

The goal of the knowledge module is to model the knowledge graph 330 to generate knowledge-based entity representation (e.g., entity representation 342). To compute entity node embeddings, a graph attention network is employed which uses the self-attention mechanism to specify different weights for different neighboring nodes. To leverage multi-relational information, the idea of composition operators is adopted to compose entity embeddings and relation embeddings. The relation embeddings are configurable to be shared across different layers. Included in the knowledge module is a function that merges a pair of entity and relation embeddings into one representation. In some embodiments, more complicated functions like MLP networks are applied.

The initial entity embeddings and relation embeddings are generated from the first language module 320. Then, the output entity embeddings (e.g., entity representation 342) from the last layer of the graph convolution network 340 are used as the final entity representations.

In some instances, the knowledge graph 330 is very large, making the embedding update over all the entities not tractable. In such instances, a minibatch setting is employed wherein give a set of input entities, a neighborhood sampling is performed to generate their multi-hop neighbor sets. Thus, representations are only computed on the entities and relations that are necessary for the embedding update. In other words, in some embodiments, a sub-portion of the knowledge graph is used, wherein a number of nodes (i.e., entities) and/or a number of relations is restricted to a maximum threshold. From one node, a set of neighboring relations and entities of a particular entity is defined for some embodiments. In some embodiments, an entity context embedding memory (e.g., ECEM 322) is configured to periodically update which speeds up the pre-training process by up to 15×.

The knowledge module is trained on the knowledge graph 330 based on the aforementioned pre-training tasks (e.g., pretrain 350).

The goal of the first language module 320 is to model text data (e.g., 318) and learn context-aware representations (e.g., context representation 362). It should be appreciated that the multi-layer language module is configured as any model trained for language understanding. In some embodiments, a pre-trained RoBERTa-based module is used as the language module. Pre-training tasks include masked token prediction 372 and masked entity prediction 370 for the language module. Masked token prediction is performed by randomly masking tokens in a particular input sequence and predicting the original tokens based on the output embeddings of the language module.

Representation loss is minimized between the predicted token and the original token during training to optimize the language module. In some embodiments, masked entity prediction is performed randomly by removing a pre-determined percentage of the mentions of a target entity. Then for each removed mention, the model predicts the masked entity based on the mention's embedding. In detail, the model predicts the entity whose embedding in the ECEM 322 is closest to the mentioned entity. Since the number of entities is very large in some instances, the model uses the entity's neighbors and other randomly sampled entities as negative samples.

The representational loss is minimized between the predicted embedding and the original embedding using a loss function which is a cross entropy based on the inner product between an embeddings and each candidate entity's embedding. As shown in FIG. 2, a pre-training task is shown as masked entity prediction 370 where the task is to link the mention "Earth" to the entity "Q2: Earth".

To prevent a cyclic dependency which would create computation and optimization barriers, the base language module is decomposed into a plurality of language modules (e.g., language model 1 and language model 2). In some embodiments, the first language module 320 operates on the input 318 and/or text 316 and generates contextual representations. (See step 1 of FIG. 3). The context is embedded, wherein the first language module 320 takes the embedded context as input and outputs hidden representations for contextual embeddings. The first language module 320 also generates initial entity and relation embeddings for the knowledge module (e.g., graph convolution network 340) based on the entity description text 310 and entity relation text. (See step 2 in FIG. 3). In some instances, the embedding is provided for an entity based on the knowledge graph node an embedding is provided for the same entity identified in the entity description text, wherein the average of the embeddings is used as the initial entity embeddings. The knowledge graph relation embeddings are generated in a similar way using its description text.

The knowledge module (e.g., graph convolution network 340) then produces its output entity embeddings to be combined with the contextual embeddings from the first language module 320 during the information fusion 344, which are then sent to the second language module 360. A layer normalization is applied to the contextual embeddings before being fed into the second language module 360. (See Step 3 in FIG. 3). Finally, the second language module produces the final embeddings, which include both the contextual leveraged from the multi-layer dual language module and knowledge information leveraged from the knowledge module. (see step 4 of FIG. 3).

In further description of the entity context embedding memory (ECEM) 322, the ECEM is configured to store the initial embeddings of all KG entities. Firstly, the language module pre-computes the context embeddings for all entities and places them into the memory. The knowledge module only needs to retrieve the required embeddings from the memory instead of computing them anew.

However, as embeddings in the memory are computed from the initial (now old) language module 1 while the token embeddings are computed from the updated language module 2, there will be an undesired discrepancy. To circumvent this possibility in such instances, the whole embeddings memory is updates with the current language module according to a pre-determined number of steps or pre-determined timeframe based on the number of times the memory has already been updated, also defining a maximum number of steps between updates. In some embodiments, a momentum update is also employed to allow the ECEM to evolve more smoothly. To maximize efficiency, relation embeddings are only used during a fine-tuning or refinement training step.

The data for pre-training is collected from a general or encyclopedia-based text corpus (e.g., English Wikipedia) and obtain or generate a corresponding knowledge graph wherein a machine learning model is used to identify the entity mentions. In some embodiments, the first sixty-four consecutive tokens of a particular text source are used as the entity description text. Entities without corresponding description text are filtered out. In some instances, entities that have fewer than 5 neighbors in the knowledge graph are removed.

The language module is able to be initialized randomly via the implementation engine. In some instances, for the knowledge module, a dual-layer graph neural network is used which aggregates 2-hop neighbors. A predetermined number of sampled neighbors is applied.

The integrated knowledge-language module is then able to be used in a plurality of downstream tasks including few-shot relation classification, KGQA, and entity classification wherein the joint pre-training of the language module and knowledge module achieve higher accuracy in the natural language processing tasks as compared to a language module that does not leverage knowledge-based data.

Figure 4:
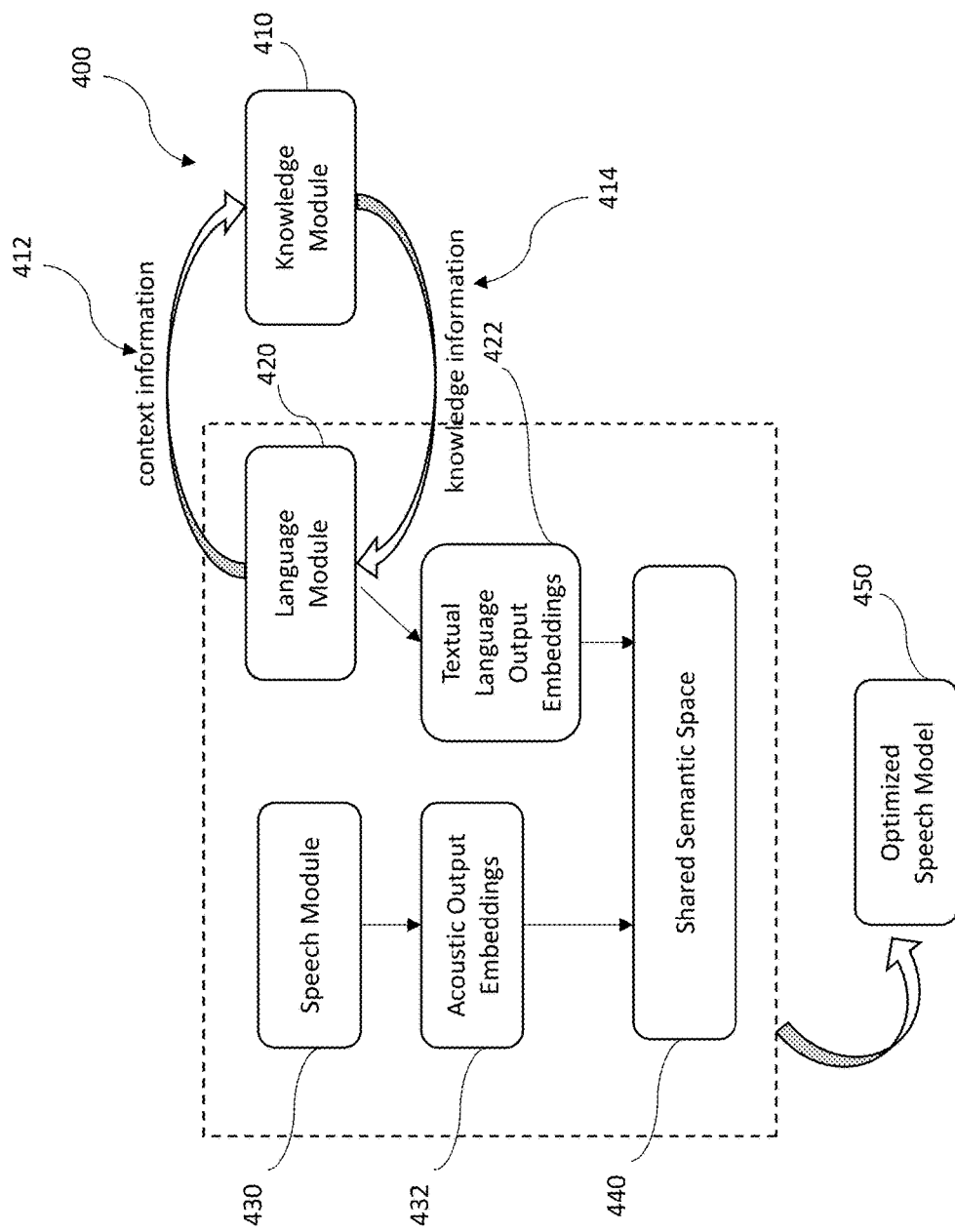
FIG. 4 illustrates one embodiment of a flow diagram having a plurality of acts associated with various methods for generating an optimized speech model.

Attention will now be directed to FIG. 4, which illustrates one example for training and generating an optimized speech model by aligning a language module from an integrated knowledge-language module and a speech module. FIG. 4 shows an integrated knowledge-language module 400 comprising a knowledge module 410 (e.g., knowledge module 212, graph convolution network 340) and a language module 420 (e.g., language module 214, language model 1 and language model 2 shown in FIG. 3). The knowledge module 410 provides knowledge information 414 to the language module 420, and the language module 420 provides context information 412 to the knowledge module 410. To prevent the cyclic dependency between the integrated modules, embodiments described in reference to FIG. 3 are employed in some embodiments.

FIG. 4 also shows a speech module 430 which is configured to produce acoustic output embeddings 432 based on input acoustic data (e.g., acoustic data 142). Additionally, the language module 420 is configured to produce textual language output embeddings 422, wherein the acoustic output embeddings 432 and the textual language output embeddings are aligned and represented into a shared semantic space 440. Once the model minimizes the error of acoustic output embeddings 432 as aligned to the textual language output embeddings 422, the language module 420 from the integrated knowledge-language module 400 is discarded, leaving an optimized speech model 450 which is able to perform natural language understanding tasks on audio data based on semantic analysis learned from alignment with the language module 420 and knowledge information 414 leveraged from the integrated knowledge-language module 400.

The goal of the speech module 430 is to learn a representation that contains useful acoustic information speech utterances included in input acoustic data such as their phonetic content and speaker characteristics. In some embodiments, the input to the speech module 430 comprises a plurality of audio features. In some instances, the audio features are based on 80-dimensional log Mel spectrograms.

Figure 5:
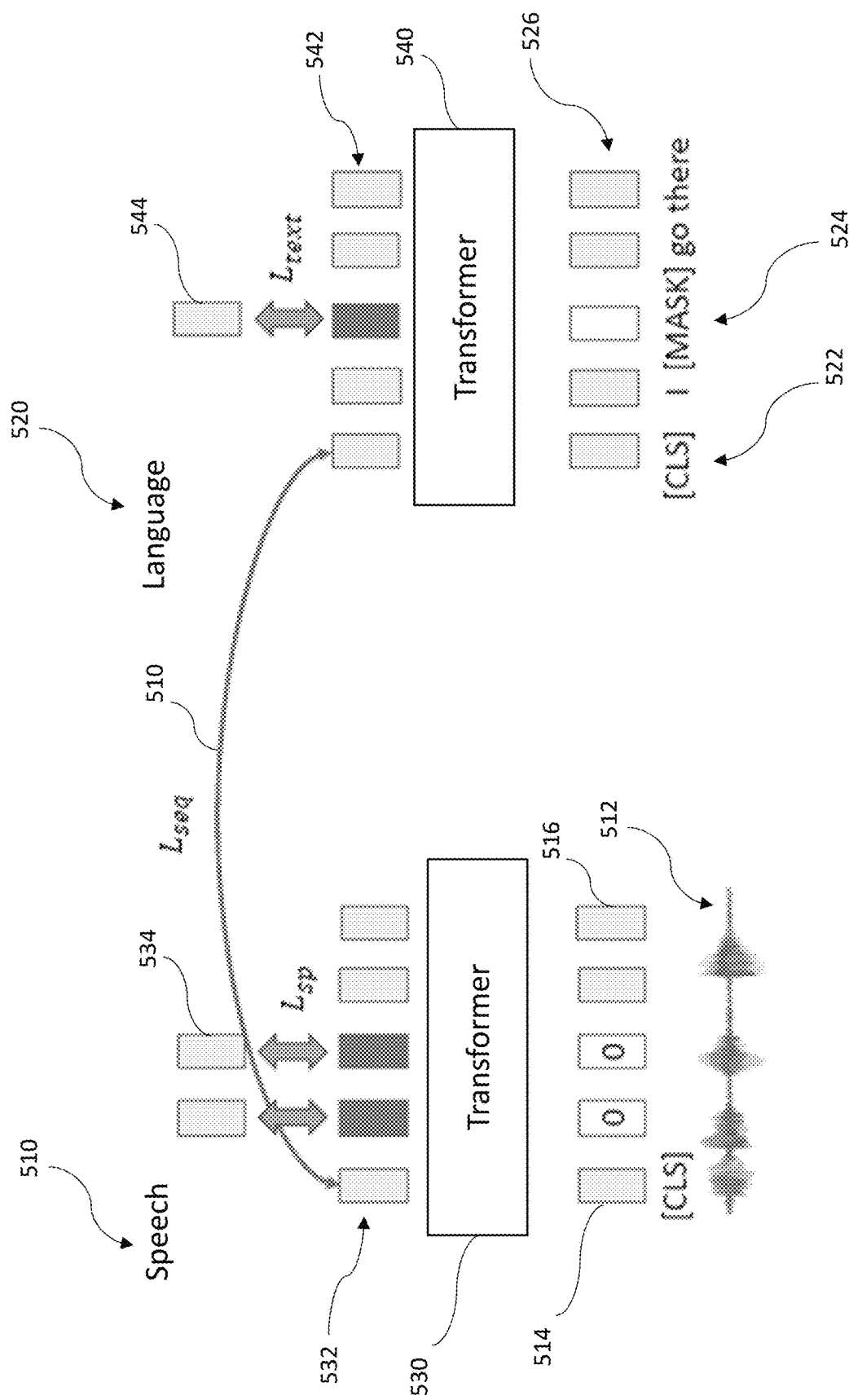
FIG. 5 illustrates an embodiment of a process flow diagram for training and generating an optimized speech model by aligning a speech module and an integrated knowledge-language module.

Attention will now be also directed to FIG. 5, in reference to FIG. 4, which illustrates an example embodiment for aligning the speech and language modules. It should be appreciated that the speech module 510 in FIG. 5 is representative of the speech module 430 of FIG. 4. Additionally, or alternatively, the language module 520 of FIG. 5 is representative of the language module 420 of FIG. 4. As shown in FIG. 5, the input for most natural language understanding tasks comprises audio signals (e.g., audio signal 512). Additionally, the model is trained to conduct semantic understanding which is enhanced when textual information (e.g., language tokens 526) is present.

The input is fed into a transformer architecture (see FIG. 5) to produce output embeddings. To boost the capacity for its contextual understanding, masked language modeling is applied to the speech module 430, with each audio feature (see audio signal 512) being replaced with a zero vector (see zero tokens of the plurality of audio tokens 516) with a pre-determined probability (e.g., 15%). The corresponding output is trained to be close to the original feature, wherein the speech module 510 is trained to predict the original feature (see predicted tokens 534) based on the output representations from the plurality of acoustic output embeddings 532 (or audio representations).

In some embodiments, the input features comprise two dimensions: time and channel (i.e., the elements in each original feature). While conventional masked language modeling masks certain timepoints, the input signals are also masked in the channel dimension. This channel masking is combined with temporal masking to reinforce the model's capability to utilize contextual information from both time and channel. This beneficially reduces the impact of co-adaptation between features.

The goal of the language module 420 is to offer contextual understanding for text input. Given a plurality of token embeddings, the module produces a plurality of contextual representations. In some embodiments, the language module 420 is initialized from a BERT-based model. As shown in FIG. 4, the language module is initialized from an integrated knowledge-language module as described herein and in references to FIGS. 2-3.

The language module is adapted to the speech domain by using the masked language modeling techniques on a plurality of speech transcripts. For example, if the input utterance "I can go there" is used a text input to the language module 520 and the word "can" is masked (see mask 524), the language module 520 is trained to predict the original word token (see predicted language token 544) based on the language output embeddings 542).

The audio signal 512 is separated into a plurality of audio tokens 516, wherein the beginning of the audio signal 512 is denoted by a specialized CLS token 514. The audio tokens 516 are applied as input to a transformer-based speech module (e.g., transformer 530) which produces a plurality of acoustic output embeddings 532 corresponding to the input audio tokens (e.g., audio tokens 516).

Text-based input utterances are converted into a plurality of language tokens 526, which each language token representing a word or phoneme from the input utterance. The beginning of the input utterance is marked with a specialized token (e.g., CLS token 522). The plurality of language tokens 526 are applied as input to a transformer-based language module (e.g., transformer 540) which produces a plurality of contextual token representations (e.g., language output embeddings 542).

The speech module 510 and the language module 520 are aligned by aligning the plurality of acoustic output embeddings 532 with the plurality of language output embeddings 542. In some embodiments, the output embeddings are aligned through sequence-level alignment or token-level alignment.

The specialized [CLS] token is a representation of the whole input sequence, not just a marker for initialization of the input sequence. Thus, during training, the distance between the representation of the [CLS] token in speech input and the [CLS] token for the text input is minimized in the shared semantic space. After pre-training, the output embedding of the [CLS] token in the speech module will be close to the correct corresponding text embedding in the language module, even when the transcript is absent in downstream tasks or when the speech module is used alone without being coupled to the language module. Thus, this alignment beneficially improves sequence-level speech language understanding tasks to predict a property of the whole audio input (e.g., for intent classification).

To achieve a finer level of alignment (e.g., token-level alignment), each audio feature is compared with its corresponding text token. Although forced alignment can establish this correspondence between audio signals and individual words in some instances, it is very laborious to acquire such labeling. Thus, computing efficiency is increased when the audio features are automatically aligned to the textual tokens (e.g., language tokens 526). This alignment then maximizes the sum of these maximum similarities over all tokens, weighted by each token's inverse document frequency (IDF) to reduce the impact of common words. When a token-level alignment is employed, it can help with token-level spoken language understanding tasks to predict the category of various segments of audio input (e.g., extractive spoken question answering). In some embodiments, a dual alignment process is performed wherein the output embeddings are aligned at both a token-level alignment and a sequence-level alignment.

In some embodiments, the alignment training is done without pre-training (i.e., the speech module is trained from scratch on downstream tasks). In some embodiments, the speech module is pre-trained, without the language module, on a training data set comprising unannotated acoustic data (i.e., self-supervised training) to understand semantic information from audio-based speech utterances. In some embodiments, the speech module is alignment to the language module at a sequence-level alignment (MLM), but the language module is not updated with the masked learning modeling.

In some embodiments, the speech module is aligned at a sequence-level and the language module is updated with MLM. In some embodiments, the speech module is aligned to the language module at a token-level alignment, but the language module is not updated with MLM. In some embodiments, the speech module is aligned to the language module at a token-level alignment, and the language module is updated with MLM.

The speech module is trained on a corpus of speech data comprising between 300 and 400 hours of speech data. For example, in some instances over three hundred hours of read speech produced by over nine hundred speakers. In some embodiments, the audio data (e.g., acoustic data 142) is formatted as 80-dimensional log Mel Spectrograms and normalize them to zero mean and unit variance per speaker as input acoustic features. In some instances, a predetermined number of hours (e.g., 10 hours) of transcript data is randomly sampled to pre-train the language module. Subsequently, the same number of hours of audio data corresponding to the transcript data (i.e., the audio data and the transcript data comprise equivalent natural speech utterances) is paired with the transcript data as training data for the speech and language module alignment.

During fine-tuning or refinement training, only the speech module, now an optimized speech module after the alignment, is used in downstream tasks. In some embodiments, a pre-determined amount (e.g., 50%, 10%, 5%, or 1%) of the original training corpus is compiled for the training data set. The optimized speech module performs nearly equally between the 100% and 50% data sets, between the 50% and 5% data sets, and even relatively optimally with the 1% dataset.

In some embodiments, the speech module is trained and aligned to the language module based on a training data set comprising 1 hour of transcribed speech data. As the human labeling process is time-consuming and labor-intensive, the amount of labeled training data for downstream tasks is often small and/or insufficient. However, the optimized speech module as described herein is less dependent on large amounts of training data because of the alignment training and other pre-training.

The optimized speech model 450 is configured as an optimized speech model trained to perform enhanced spoken language understanding. The optimized speech module (e.g., optimized speech model 450) is configured for a plurality of downstream tasks including multi-class classifications tasks and span predictions problems. Types of multi-class classifications include intent detection, dialog act classification and spoken sentiment analysis. A type of span prediction problem includes spoken question answering. To perform intent detection, the speech module is configured to correctly predict the intent of an input utterances. In some embodiments, the training data for this task comprises an utterance which is annotated with three slots: action, object, and location, where each slot can take one of multiple values. The combination of slot values is defined as the intent of the utterance. To perform dialog act classification, the speech module is trained to classify an input utterance into of one of a set of pre-defined dialog acts. To perform spoken sentiment analysis, the speech module is trained to classify the input utterances based on range of negative-positive sentiment scores.

In some embodiments, for multi-class classification tasks, a MLP network comprising a hidden layer (e.g., 512 unit layer) is appended on top of the optimized speech module. The network is configured to convert the output representation of the [CLS] token for class prediction. Both the optimized speech module and the randomly initials MLP network are refined or fine-tuned on a training data set for a pre-determined number of epochs (e.g., for 10 epochs) with a pre-defined batch size and a fixed learning rate. The alignment framework further includes the integration of automatic speech recognition (ASR) machine learning models and natural language generation (NLG) to achieve performance for spoken language generation tasks.

Many technical benefits are achieved through the joint pre-training (e.g., training and alignment) of the speech module and language module, especially for many downstream tasks. For example, many convention end-to-end SLU models require labeled speech data because they use an auto-encoder to initialize the SLU model or other pre-training methods that must be trained under supervised learning processes. The optimized speech module is able to use a large unlabeled training data set because of the alignment training. Furthermore, many conventional SLU datasets that do try to leverage both speech and text input data only have access to larger amounts of speech data for downstream tasks. The disclosed embodiments beneficially provide an optimized speech module that only uses speech input for downstream tasks, but still leverages language understanding typically gained from text input because of the alignment training prior to the downstream task performance.

Figure 6:
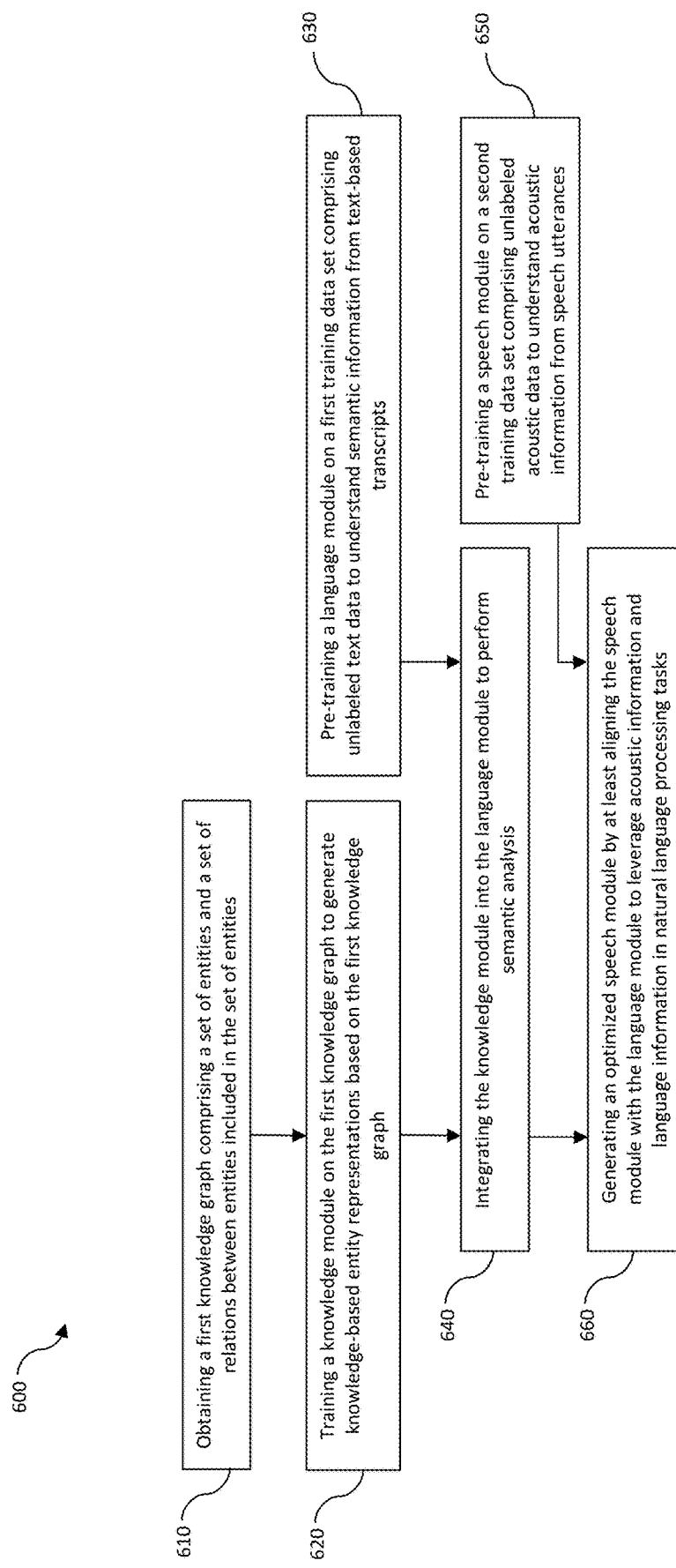
FIG. 6 illustrates an embodiment of a flow diagram having a plurality of acts for aligning a speech module with a language module to generate an optimized speech model.

Attention will now be directed to FIG. 6 which illustrates a flow diagram 600 that includes various acts (act 610, act 620, act 630, act 640, and act 650) associated with exemplary methods that can be implemented by computing system 110 for obtaining training data and training a machine learning model for generating an optimized speech module.

The first illustrated act includes an act of obtaining a first knowledge graph (e.g., from knowledge graph data 141 and/or knowledge graph 220) comprising a set of entities (e.g., entity 332) and a set of relations between entities included in the set of entities (act 610). Subsequently, the computing system trains a knowledge module (e.g., knowledge module 147) on the first knowledge graph to generate knowledge-based entity representations (e.g., entity representation 342) based on the first knowledge graph (act 620).

A language module (e.g., language module 145) is also pre-trained on a first training data set comprising unlabeled text data to understand semantic information from text-based transcripts (act 630). After the knowledge module and language module are trained, the computing system integrates the knowledge module into the language module (e.g., integrated knowledge-language module 210) to perform semantic analysis (act 640).

The integrated knowledge-language module is generated by at least integrating the knowledge module with the language module, in addition to one or more additional operations. These operations include one or more of the following: performing an initial integration between the language module and the knowledge module and then adapting the integrated knowledge-language module to new knowledge graphs. Additionally, or alternatively, generating the integrated knowledge-language module includes pre-training tasks and/or post-training tasks that prepare or adapt the integrated knowledge-language module to one or more training data sets and/or includes changing one or more layers of either the graph convolution network of the knowledge module, and/or neural networks of the language module and/or the integrated knowledge-language module. It should be appreciated that the description corresponding to generating an integrated knowledge-language module including at least an integration process and one or more additional operations or acts is also applicable to generating an integrated knowledge-speech module.

Additionally, a speech module (e.g., speech module 144) is pre-trained on a second training data set comprising unlabeled acoustic data (e.g., acoustic data 142) to understand acoustic information from speech utterances (act 650).

Finally, an optimized speech module (e.g., optimized speech model 450) is generated by at least aligning the speech module with the language module to leverage acoustic information and language information in natural language processing tasks (act 660).

With regard to the acts described in FIG. 6, it will be appreciated that they can be performed in different ordering than the ordering that is explicitly shown in the flow diagram 600. For instance, while acts 610/620 and act 630 and/or act 650 may performed in parallel with each other, in some alternative embodiments, act 620, act 630 and act 650 are performed in series.

It will also be appreciated that the act of generating TTS speech data may occur with the same computer device(s) that performed the aforementioned acts (e.g., acts 610-660), or alternatively by one or more different computer device(s) of a same distributed computing system.

The alignment of the speech and language model is also capable of being performed by obtaining a third training data set comprising paired acoustic data and transcript data, applying the third training data set to the speech module and language model, obtaining acoustic output embeddings (e.g., acoustic output embeddings 432) from the speech module, obtaining language output embeddings (e.g., textual language output embeddings 422) from the language module, and aligning the acoustic output embeddings and the language output embeddings to a shared semantic space (e.g., shared semantic space 440). In some embodiments, the acoustic output embeddings and the language output embeddings are aligned to the shared semantic space at a sequence-level.

In some embodiments, the speech module is a transformer-encoder machine learning model (see speech module 510).

After aligning the speech module and the language module, the speech module is used to perform intent detection tasks to correctly predict the intent of an input utterance and/or dialog act classification to correctly classify an input utterance to correspond to a pre-determined dialog act.

After aligning the speech module and the language module, the speech module is used to perform spoken sentiment analysis tasks to annotate an input utterance with a sentiment score and/or spoken question answering tasks to predict a time span in a spoken article that answers an input question.

In some embodiments, the speech module uses a self-attention mechanism to implicitly align elements of the spoken article and textual features of the input question.

The third training data set may be limited to less than 1 hour of unlabeled acoustic data or, in some instances, less than 10 minutes of unlabeled acoustic data (see, act 650).

The knowledge module of the integrated knowledge-language module (see, act 640) comprises a graph attention network and is configured to provide structure-aware entity embeddings (e.g., textual language output embeddings 422) for language modeling.

The language module of the integrated knowledge-language module is further configured to produce contextual representations as initials embeddings for knowledge graph entities and relations.

The integrating of the language module and knowledge module comprises projecting entity and relations output embeddings and language text embeddings into a shared semantic space.

In some embodiments, the language module of the integrated knowledge-language module comprises a first language model (e.g., first language module 320) comprising a first set of transformer layers and a second language model (e.g., second language module 360) comprising a second set of transformer layers.

In some embodiments, the alignment of the speech and language modules comprises obtaining a first set of contextual embeddings from the first language module and applying the first set of contextual embeddings as input to the second language module and the knowledge module (e.g., information fusion 344).

In some embodiments, the alignment of the language and speech modules further comprises: obtaining a first set of entity embeddings (e.g., entity representation 342) from the knowledge module (e.g., graph convolution network 340), applying the first set of entity embeddings as input to the second language module (e.g., information fusion 344), and obtaining a final representation output embedding (e.g., context representation 362) from the second language module based on the first set of entity embeddings and the first set of contextual embeddings, the final representation output embedding including contextual and knowledge information.

Figure 7:
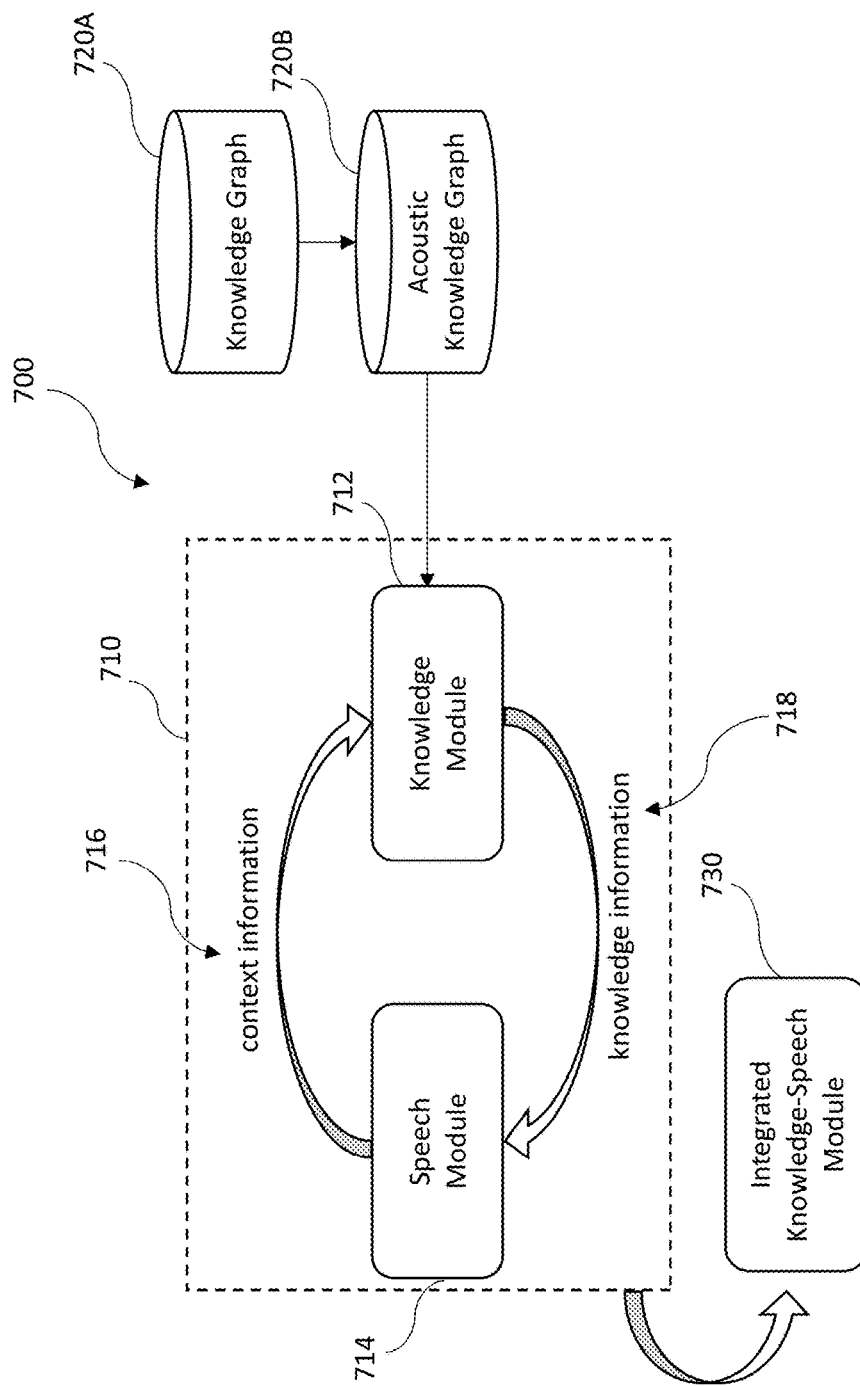
FIG. 7 illustrates one embodiment of a flow diagram for training a knowledge module on an acoustic knowledge graph and generating an integrated knowledge-speech module.

Attention will now be directed to FIG. 7, which illustrates one example for training and an integration process 700 for integrating a speech module and a knowledge module (see speech-knowledge cycle or integrated knowledge-speech module 710) to generate an integrated knowledge-speech module 730. As shown in the figure, the knowledge module 712 is trained on one or more knowledge graphs (e.g., knowledge graph 720A and/or acoustic knowledge graph 720B). Knowledge Information 718 output from the knowledge module 712 is applied to the speech module 714, which in turn provides acoustic information 716 to applied to the speech module 714. In some embodiments, the speech module 714 is pre-trained on acoustic data to understand semantics of audio-based natural language utterances. Additionally, acoustic information 716 obtained from the speech module 714 is applied to the knowledge module 712.

By integrating the knowledge module 712 and the speech module 714, each module provides essential information to mutually assist each other in their respective tasks. For example, the knowledge module 212 produces knowledge-based embeddings for entities included in audio data (e.g., knowledge information 718) while the speech module generates speech-aware initial embeddings for entities and relations in the graph (e.g., acoustic information 716).

Thus, in both modules, content understanding is based on related knowledge and acoustic understanding. Referred to as joint-training in some instances, the integration or joint-training of the knowledge module 712 and the speech module 714 enables the projection of the entities/relations included in the knowledge graph (e.g., knowledge graph data 141) and audio (e.g., acoustic data 142) into a shared semantic latent space. As the knowledge module 712 produces representations from descriptive audio, it solves the over-parameterization issue that can arise because entity embeddings are no longer part of the initial knowledge module's parameters.

Like the integrated knowledge-language module of FIG. 2, a further benefit of the disclosed embodiments includes the ability to easily adapt to unheard acoustic knowledge graphs in the refinement phase (e.g., as carried out by the refinement engine 157). As the initial embeddings of entities and relations come from their descriptive audio, the joint-training and/or integration of the modules is not confined to any fixed knowledge graph. With the learned ability to integrate structural information during pre-training, the framework is extensible to novel knowledge graphs with previously unseen entities and relations.

In some embodiments, the knowledge graph 720A and acoustic knowledge graph 720B comprise information about world knowledge, entities, and relations, wherein the knowledge graph 220 is configured to act as a supplement to an existing pre-trained speech model. In some embodiments, the knowledge module is initially trained on knowledge graph 720A representative of KG 330 of FIG. 3). In some embodiments, knowledge graph 720A is converted to an acoustic knowledge graph (e.g., acoustic knowledge graph 720B). In some instances, the acoustic knowledge graph 720B is converted from a text-based knowledge graph (e.g., knowledge graph 720A) by applying a neural text-to-speech (TTS) machine learning model (see FIG. 8), which is configured to convert text into audio speech.

The first knowledge graph (text-based knowledge graph) is transformed into an acoustic knowledge graph by first obtaining electronic content comprising acoustic data that describes the set of entities and the set of relations between two or more entities included in the set of entities. Next, the computing system extracts a set of acoustic features from the electronic content. The acoustic data is transcribed into text, the text representing the set of entities and the set of relations included in the first knowledge graph. The knowledge module is then trained on the text and the set of acoustic features, the knowledge module being configured to generate acoustic-based entity representations.

Additionally, or alternatively, the first knowledge graph is transformed into an acoustic knowledge graph by extracting a set of textual representations for each entity of the set of entities and each relation of the set of relations, accessing a text-to-speech module, and applying the set of textual representations as input to the text-to-speech module. Subsequently, a set of acoustic signals is obtained, wherein the acoustic signals correspond to the textual representations as output from the text-to-speech module. Each acoustic signal of the set of acoustic signals representing an entity of the set of entities included in the first knowledge graph or a relation of the set of relations included in the first knowledge graph.

Figure 8:
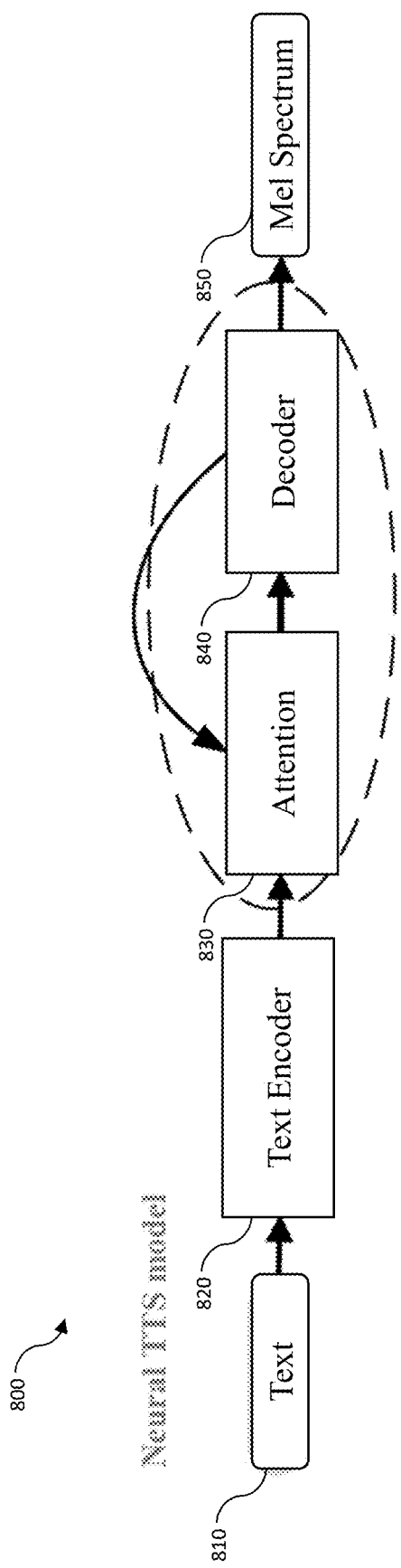
FIG. 8 illustrates one embodiment of a system diagram for a neural text-to-speech model.

Attention will now be directed to FIG. 8 which illustrates one example of a TTS machine learning model that can be trained is a neural TTS model 800, which includes a text encoder 820 and a decoder 840. In some instances, attention 830 is used by the model to direct and inform the encoding-decoding process at various layers of the model. The neural TTS model 800 is able to generate output (e.g., speech waveform data) in the Mel spectrum or other spectrum such that the generated output is speech data based on the input text 810. The Mel spectrum 850 (i.e., synthesized speech data) is characterized by the personalized voice of a particular user.

Figure 9:
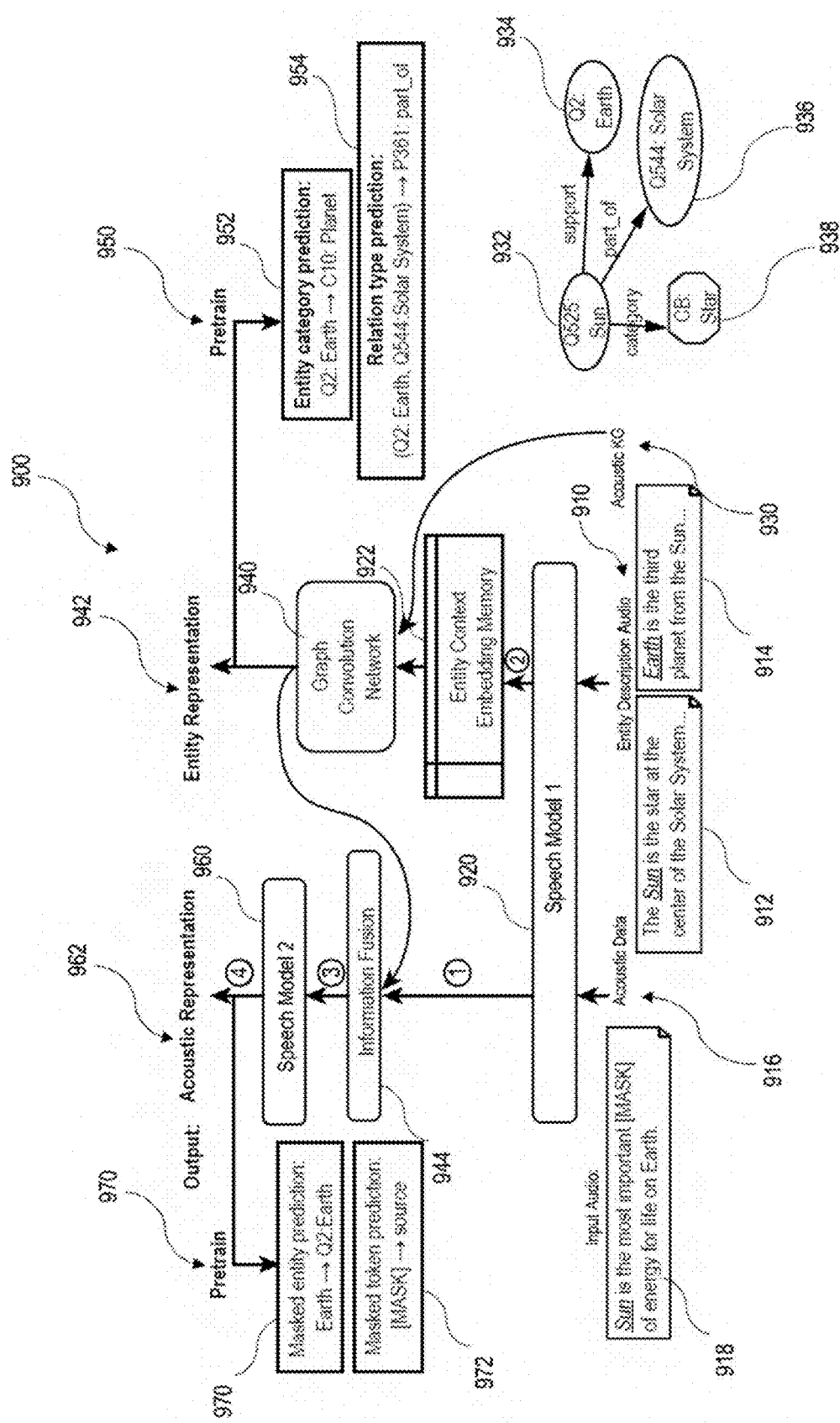
FIG. 9 illustrates one embodiment of a flow diagram for integrating a dual speech model module with a knowledge module.

Attention will now be directed to FIG. 9, in partial reference to FIG. 3, which illustrates one example for training and integrating a dual-speech module with a knowledge module to generate an integrated knowledge-speech module. In order to solve the cyclic dependency between the two modules, some embodiments comprise a multi-layer speech model (e.g., a first speech module 920 and a second speech module 960) where the first speech module provides embeddings (see embeddings at locations 1 and 2) for both the second speech module 960 and a knowledge module configured as a graph convolution network 940 (in some instances, representative of graph convolution network 340). The acoustic-based entity embeddings (e.g., entity representation 942) from the knowledge module (e.g., graph convolution network 940) are also fed into the second speech module (see information fusion 944), which produces the final representation (e.g., acoustic representation 962).

In some embodiments, the first speech module 920 and the second speech module 960 are formed as the first several transformer layers and the rest layers of a pre-trained speech model.

An acoustic knowledge graph (KG) 930 is shown having a set of entities (e.g., Sun 932, Earth 934, Solar System 936, Star 938) and. set of relations between at least two of the entities (e.g., support, part_of, category). Thus, the acoustic knowledge graph 930 is formed from a plurality of head-relation-tail triplets (e.g., [Sun 932]-[support]-[Earth 934], [Sun 932]-[part_of]-[Solar System 936], [Sun 932]-[category]-[Star 938]). The entities and relations are stored as audio-based data at each of the nodes of the acoustic knowledge graph.

As entities in the acoustic knowledge graph are represented by nodes without context or other acoustic information, some embodiments utilize entity description audio 910 to describe the concept and meaning of the entities. For each entity, its description audio describes the entity (e.g., "The Sun is the star at the center of the solar system" 912 and "Earth is the third planet from the Sun" 914). In some instances where there are multiple mentions or detections of an entity in its description audio, the first mention is the one used during training. Similarly, relations can be further described by relation description audio.

Similar to pre-training techniques described for FIG. 3, in some embodiments, the pre-training tasks for the speech module are self-supervised, supervised, pseudo-supervised or a combination thereof. In some embodiments, pre-training tasks include entity category classification/prediction 952 where an acoustic-based entity is masked, and the module is tasked with predicting the missing or masked acoustic-based entity and/or relation type prediction 954 for the knowledge module wherein an acoustic-based relation between at least two entities is masked and the module is tasked with predicting a relation type in audio form.

The goal of the knowledge module is to model the acoustic knowledge graph 930 to generate knowledge-based acoustic entity representations (e.g., entity representation 942). The initial entity embeddings and relation embeddings are generated from the first speech module 920. Then, the output entity embeddings (e.g., entity representation 942) from the last layer of the graph convolution network 940 are used as the final entity representations.

When the acoustic knowledge graph 930 is very large, making the embedding update over all the entities not tractable, a minibatch setting is employed wherein give a set of input entities, a neighborhood sampling is performed to generate their multi-hop neighbor sets. Thus, representations are only computed on the entities and relations that are necessary for the embedding update. In other words, a sub-portion of the knowledge graph is used, wherein a number of nodes (i.e., entities) and/or a number of relations is restricted to a maximum threshold. From one node, a set of neighboring relations and entities of a particular entity is defined for some embodiments.

An entity context embedding memory (i.e., ECEM 922), representative to ECEM 322 is configured to periodically update which speeds up the pre-training process by up to 15×. The knowledge module is trained on the acoustic knowledge graph 930 based on the aforementioned pre-training tasks, in reference to FIGS. 3 and 9.

The goal of the first speech module 920 is to model acoustic data (e.g., input audio 918 or acoustic data 916) and learn acoustic and/or context-aware representations (e.g., acoustic representation 962). It should be appreciated that the multi-layer speech module is configured as any model trained for natural language speech understanding. The pre-training tasks include masked acoustic token prediction 972 and masked acoustic entity prediction 970 for the speech module. In detail, the model predicts the entity whose embedding in the ECEM 922 is closest to the mentioned entity. Since the number of acoustic-based entities is very large in some instances, the model uses the entity's neighbors and other randomly sampled entities as negative samples.

To prevent a cyclic dependency which would create computation and optimization barriers, the base speech module/model, as shown, is decomposed into a plurality of speech modules (e.g., speech model 1 and speech model 2). The first speech module 920 operates on the input audio 918 and generates acoustic representation representations. (See step 1 of FIG. 9). When the audio is embedded, the first speech module 920 takes the embedded audio as input and outputs hidden representations for acoustic embeddings. The first speech module 920 also generates initial acoustic-based entity and relation embeddings for the knowledge module (e.g., graph convolution network 940) based on the entity description audio 910, which also includes entity relation description (See step 2 in FIG. 9). In some instances, the embedding is provided for an entity based on the knowledge graph node an embedding is provided for the same entity identified in the entity description audio, wherein the average of the embeddings is used as the initial entity embeddings. The knowledge graph relation embeddings are generated in a similar way using its description audio.

The knowledge module (e.g., graph convolution network 940) then produces its output entity embeddings to be combined with the acoustic embeddings from the first speech module 920 during the information fusion 944, which are then sent to the second speech module 960. In some instances, a layer normalization is applied to the acoustic embeddings before being fed into the second speech module 960. (See Step 3 in FIG. 9). Finally, the second speech module produces the final embeddings, which include both the acoustic information leveraged from the multi-layer dual speech module and knowledge information leveraged from the knowledge module. (see step 4 of FIG. 9).

In further description of the entity context embedding memory (ECEM) 922, the ECEM is configured to store the initial embeddings of all KG entities. Firstly, the speech module pre-computes the acoustic embeddings for all entities and places them into the memory. The knowledge module only needs to retrieve the required embeddings from the memory instead of computing them anew.

The integrated knowledge-speech module 900 is then able to be used in many downstream tasks for natural language understanding, spoken language understanding, speech recognition, and other audio-based natural language processing tasks.

Figure 10:
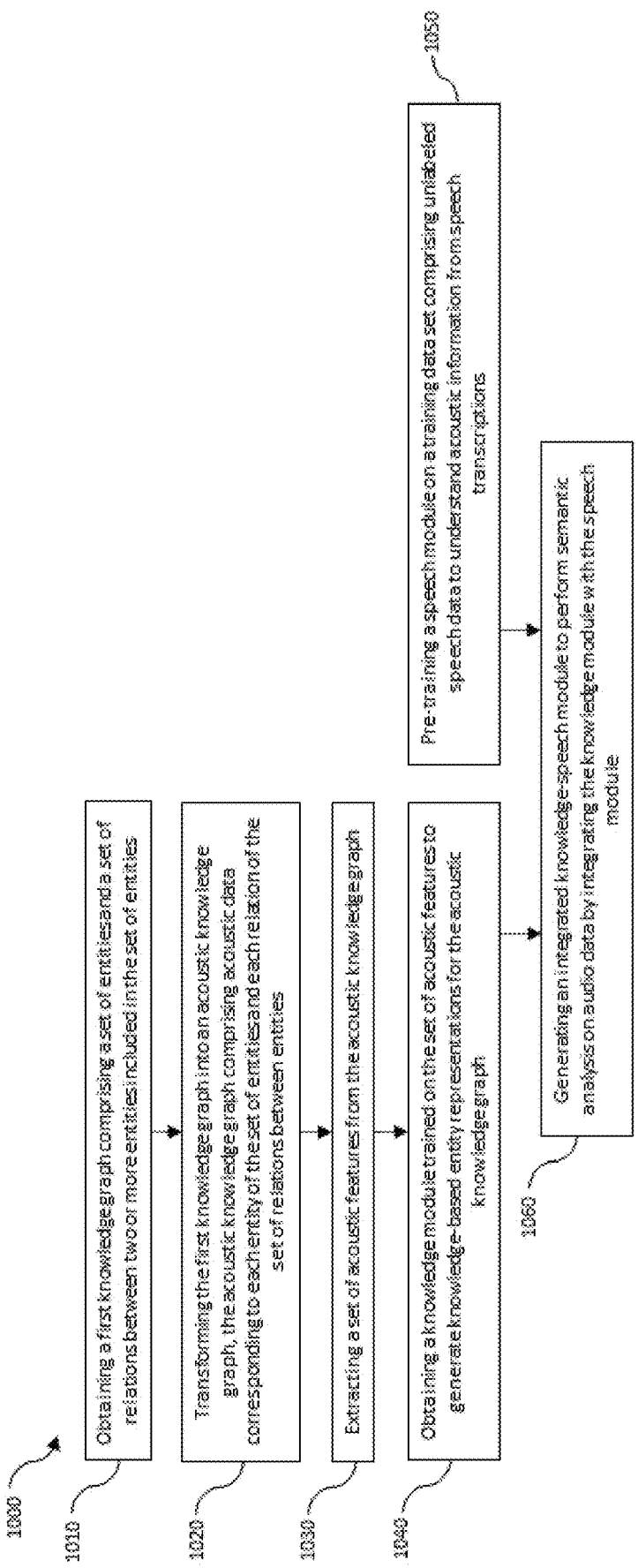
FIG. 10 illustrates one embodiment of flow diagram having a plurality of acts for generating an integrated knowledge-speech module.

Attention will now be directed to FIG. 10 which illustrates a flow diagram 1000 that includes various acts (act 1010, act 1020, act 1030, act 1040, act 1050, and act 1060) associated with exemplary methods that can be implemented by computing system 110 for obtaining training data and training a machine learning model for generating an integrated knowledge-speech module to perform semantic analysis on audio data.

The first illustrated act includes an act of obtaining a first knowledge graph (e.g., knowledge graph 720A) comprising a set of entities and a set of relations between two or more entities included in the set of entities (act 1010). Subsequently, the computing system transforms the first knowledge graph into an acoustic knowledge graph (e.g., acoustic knowledge graph 720B), the acoustic knowledge graph comprising acoustic data (e.g., acoustic data 142) corresponding to each entity of the set of entities and each relation of the set of relations between entities (act 1020). After transforming the knowledge graph, a set of acoustic features is extracted from the acoustic knowledge graph (act 1030). The knowledge module is then trained on the set of acoustic features to generate knowledge-based entity representations for the acoustic knowledge graph, or a similarly trained module is obtained (act 1040).

The computing system also pre-trains a speech module (e.g., speech module 714) on a training data set comprising unlabeled speech data to understand acoustic information from speech transcriptions (act 1050). Finally, an integrated knowledge-speech module (e.g., integrated knowledge-speech module 730) is generated to perform semantic analysis on audio data by at least integrating the knowledge module with the speech module (act 1060).

Methods and system are also provided for pre-training a language module on a second training data set comprising unlabeled text-based data, the language module being configured to understand semantic information from speech transcriptions and aligning the speech module and the language module. In such embodiments, the speech module being configured to leverage acoustic information and language information in natural language processing tasks.

Where the speech module and the language model are aligned, a third training data set comprising paired acoustic data and transcript data is obtained and applied to the speech module and language model. Acoustic output embeddings are obtained from the speech module, as well as language output embeddings obtained from the language module. The alignment training then further comprises aligning the acoustic output embeddings and the language output embeddings to a shared semantic space (see FIG. 4).

Then, after pre-training the language module, the computing system extracts a set of textual features from the first knowledge graph and trains a second knowledge module on the set of textual features. Then, the second knowledge module is integrated with the language module before the language module and speech module are aligned.

The knowledge module of the coupled knowledge-speech module comprises a graph attention network and is configured to provide acoustic-based structure aware entity embeddings (e.g., entity representation 942) for speech modeling.

The speech module of the integrated knowledge-speech module is further configured to produce acoustic language representations as initial embeddings for acoustic knowledge graph entities and relations.

Integrating the language module and knowledge module comprises projecting entity and relations output embeddings and language acoustic embeddings into a shared semantic space.

In some embodiments, the speech module of the integrated knowledge-speech module comprises a first speech model (e.g., first speech module 920) and a second speech model (e.g., second speech module 960).

In some embodiments, the first speech module comprises a first set of transformer layers and the second speech module comprises a second set of transformer layers.

The integrating of the speech module and knowledge module is possible by obtaining a first set of acoustic language embeddings from the first acoustic module and applying the first set of acoustic language embeddings as input to the second language module and the knowledge module (see information fusion 944).

Integrating the speech module and knowledge module also includes processes and training configured for obtaining a first set of acoustic entity embeddings (e.g., entity representation 942) from the knowledge module and applying the first set of acoustic entity embeddings as input to the second speech module (see information fusion 944).

Finally, a final representation output embedding (e.g., acoustic representation 962) is obtained from the second speech module based on the first set of acoustic entity embeddings and the first set of acoustic language embeddings, the final representation output embedding including acoustic and knowledge information.

In some embodiments, each entity of the set of entities is represented by entity description audio data (e.g., entity description audio 910) to describe the concept and meaning of the entities and each relation of the set of relations is represented by relation description audio data to describe each relation between two or more entities.

In some embodiments, the integrated knowledge-speech module is optimized by performing one or more of the following training tasks: entity category prediction, relation type prediction, masked token prediction, or masked entity prediction.

From a run-time perspective, the computing system will obtain electronic content comprising a set of audio data, operate an integrated knowledge-speech module configured to perform semantic analysis on audio data, and perform semantic analysis on the set of audio data. The integrated knowledge-speech module comprises a speech module trained to understand acoustic information from speech transcriptions and a language module integrated to the speech module and trained to generate knowledge-based entity representation for an acoustic knowledge graph. As previously mentioned, the speech module of the integrated knowledge-speech module may include a first speech module comprising a first set of transformer layers and a second speech module comprising a second set of transformer layers.

Figure 11:
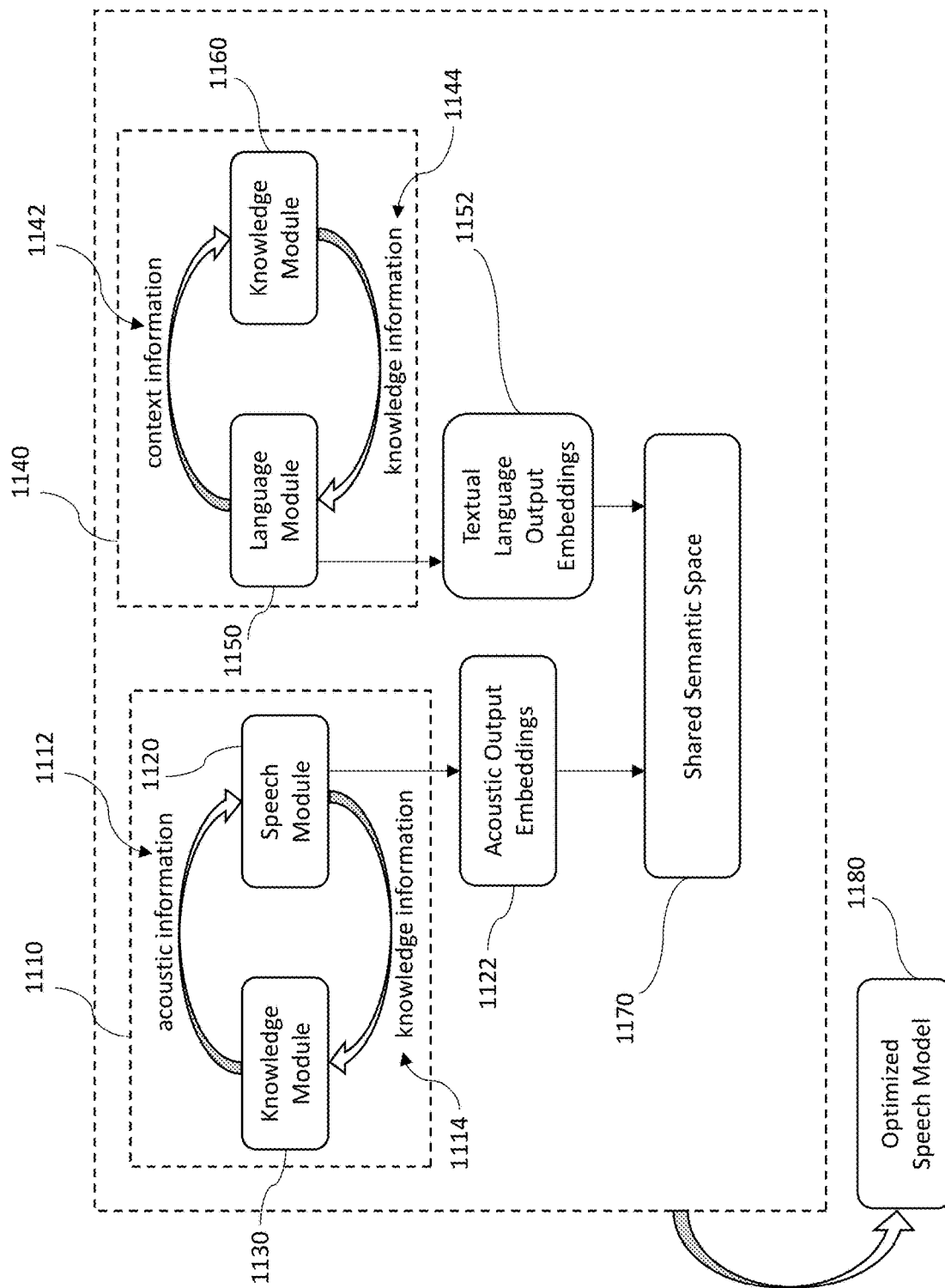
FIG. 11 illustrates one embodiment of aligning a speech module included in an integrated knowledge-speech module with a language module included in an integrated knowledge-language module.

Attention will now be directed to FIG. 11, which illustrates an overview of generating an optimized speech model by training and integrated a speech module from an integrated knowledge-speech module and a language module from an integrated knowledge-language module. In particular, FIG. 11 shows an integrated knowledge-speech module 1110 comprising a speech module 1120 and an acoustic-based knowledge module 1130 (or other type of knowledge module). In some embodiments, integrated knowledge-speech module 1110 is representative of integrated knowledge-speech module 710, wherein acoustic information 1112 and knowledge information 1114 are cycled through various layers of the machine learning model as described in reference to FIGS. 7 and 9.

Additionally, FIG. 11 shows an integrated knowledge-language module 1140 which, in some embodiments, is representative of the integrated knowledge-language modules as shown in FIGS. 2, 3, and/or 4. Context information 1142 and knowledge information 1144 is cyclically shared between the modules. After generating and/or accessing the integrated knowledge-speech module 1110 and integrated knowledge-language module 1140, the speech module 1120 and language module 1150 are aligned.

Acoustic output embeddings 1122 obtained from the speech module 1120 and textual language output embeddings 1152 are aligned to the shared semantic space 1170 via methods and systems described herein, for example in reference to FIGS. 4 and 5. After the modules are aligned, an optimized speech module 1180 is generated. Optimized speech module 1180 is then able to perform semantic analysis on acoustic data while leveraging information learned from the acoustic-based knowledge module 1130, the language module 1150, and the language-based knowledge module 1160 as a super-trained optimized speech module.

For example, the computing system is configured to pre-train a language model (e.g., language module 1150) on a second training data set comprising unlabeled text-based data, the language module being configured to understand semantic information from speech transcriptions.

The speech module (e.g., speech module 1120) and the language module are then aligned, the speech module being configured to leverage acoustic information and language information in natural language processing tasks.

After pre-training the language module, a set of textual features is extracted from the first knowledge graph, wherein a second knowledge module (e.g., language-based knowledge module 1160) is trained on the set of textual features. Subsequently, the second knowledge module is integrated with the language module before the language module and speech module are aligned to the same semantic space (e.g., 1170).

Figure 12:
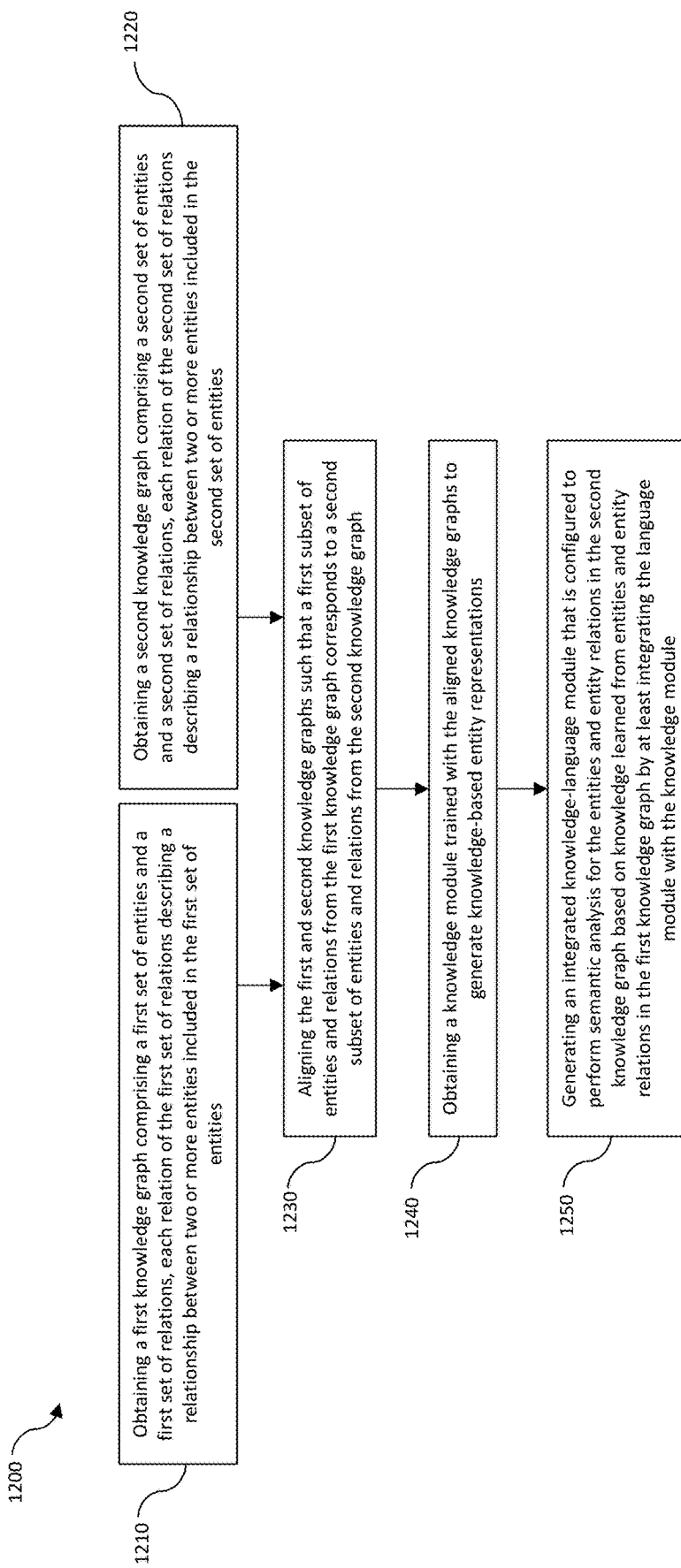
FIG. 12 illustrates one embodiment of a flow diagram having a plurality of acts for generating an integrated knowledge-language module by aligning a first and second knowledge graph and training the knowledge module on the aligned knowledge graphs.

Attention will now be directed to FIG. 12 which illustrates a flow diagram 1200 that includes various acts (act 1210, act 1220, act 1230, act 1240, and act 1250) associated with exemplary methods that can be implemented by computing system 110 for obtaining training data and training a machine learning model for generating an integrated knowledge-language module to perform semantic analysis.

The first illustrated act includes an act of obtaining a first knowledge graph comprising a set of entities and a set of relations between two or more entities included in the set of entities (act 1210). In series, or in parallel, the computing system also obtains a second knowledge graph comprising a second set of entities and a second set of relations, each relation of the second set of relations describing a relationship between two or more entities includes in the second set of entities (act 1220).

After obtaining the first and second knowledge graphs, the first knowledge graph and second knowledge graphs are aligned such that a first subset of entities and relations from the first knowledge graph correspond to a second subset of entities and relations from the second knowledge graph (act 1230). Subsequently, a knowledge module is trained, or a pre-trained module is obtained, the training being with the aligned knowledge graphs to generate knowledge-based entity representations (act 1240). Finally, an integrated knowledge-language module is generated (act 1250). The integrated knowledge-language module is configured to perform semantic analysis for the entities and entity relations in the second knowledge graph based on knowledge learned from entities and entity relations in the first knowledge graph by at least integrating the language module with the knowledge module.

Figure 13:
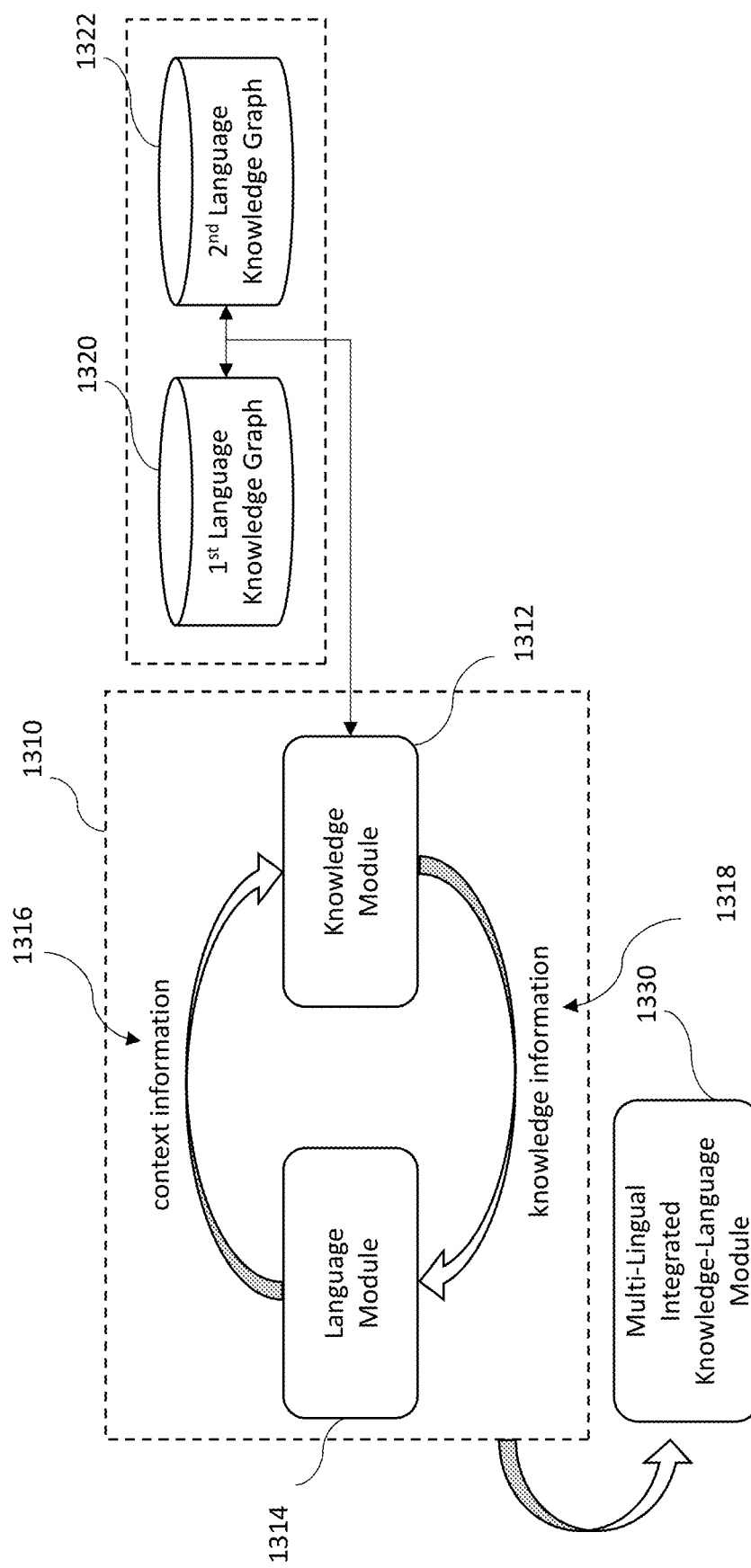
FIG. 13 illustrates one embodiment of process flow diagram for generating a multi-lingual integrated knowledge-language module.

Attention will now be directed to FIG. 13, which illustrates one example for training and integrating a multi-lingual integrated knowledge-language module 1330. In some embodiments, the first knowledge graph is generated in first language (e.g., first language knowledge graph 1320) and the second knowledge graph is generated in a second language (e.g., second language knowledge graph 1322). In such embodiments, the knowledge module 1312 is configured to generate knowledge-based entity representations in the second language based on the first knowledge graph.

The computing system (e.g., computing system 110) is also configured to train (e.g., via the training engine) the multi-lingual integrated knowledge-language module 1330 to perform semantic analysis in the second language based on knowledge learned from entities and entity relations in the first language. In some instances, the implementation engine is used to operate the integrated knowledge-language module 1310 to perform semantic analysis on data input.

Additionally, or alternatively, the knowledge module 1312 is also configured to generate knowledge-based entity representations (e.g., knowledge information 1318) in the first language based on the second knowledge graph. In such embodiments, the multi-lingual integrated knowledge-language module 1330 is trained to perform semantic analysis in the first language based on knowledge learned from entities and entity relations in the second language. The language module 1314 is also configured to provide context information 1316 to the knowledge module 1312.

The first language knowledge graph 1320 and second language knowledge graph 1322 are optionally language or textual-based knowledge graphs corresponding to the same or different languages. Accordingly, methods and systems are provided for obtaining electronic content comprising a first set of speech transcriptions in the first language and applying the electronic content as input to the knowledge-language module, wherein the first set of speech transcriptions is translated into a second set of speech transcriptions in the second language using the integrated knowledge-language module.

Additionally, or alternatively, the first language knowledge graph 1320 and/or the second language knowledge graph 1322 may also be acoustic-based knowledge graphs, wherein a multi-lingual integrated knowledge-speech module is generated (instead of the knowledge graph being integrated with a language module as depicted in FIG. 13). In such embodiments, the first acoustic knowledge graph is generated in the first language and the second acoustic knowledge graph is generated in a second language. The knowledge module 1312 is then trained to generate acoustic knowledge-based entity representations in the first language based on the second acoustic knowledge graph. In some instances, the integrated knowledge-speech module is trained to perform semantic analysis in the first language based on knowledge learned from entities and entity relations in the second language.

Methods and systems are also provided for generating an integrated knowledge-speech module by obtaining electronic content comprising a first set of speech audio data in the first language, applying the electronic content as input to the integrated knowledge-speech module, and translating the first set of speech audio data into a second set of speech audio data in the second language using the integrated knowledge-speech module.

Figure 14:
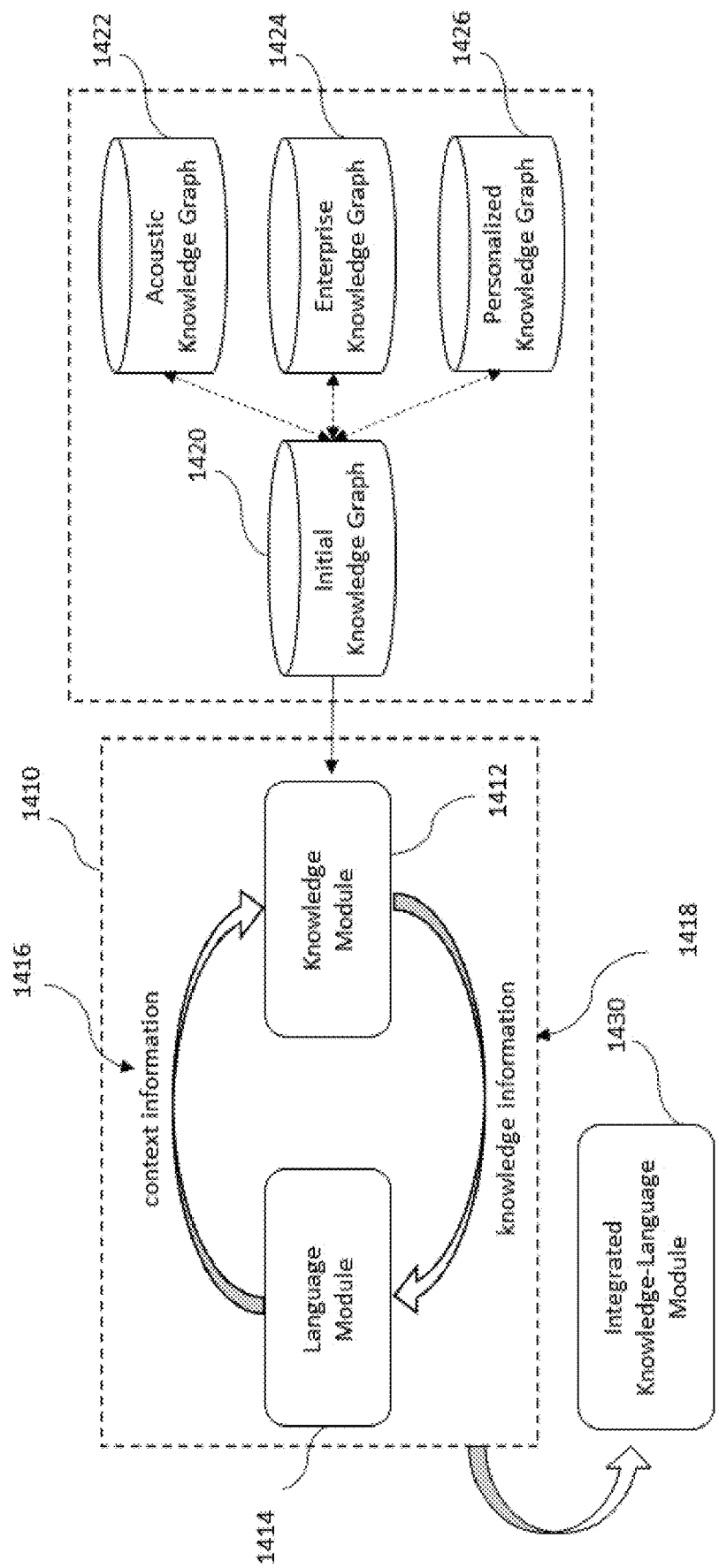
FIG. 14 illustrates one embodiment of a process flow diagram for aligning one or more custom knowledge graphs with an initial knowledge graph.

Attention will now be directed to FIG. 14, which illustrates a system and method for generating an integrated knowledge-language module based on a multi-knowledge graph alignment. For example, FIG. 14 shows a knowledge module 1412 which provides knowledge information 1418 to a language module 1414, which in turn provides context information to the knowledge module 1412.

The knowledge module 1412 is trained on one or more knowledge graphs. In some embodiments, the knowledge module is trained on an initial knowledge graph 1420, and in subsequent training processes, the initial knowledge graph 1420 is aligned with one or more customized knowledge graphs. In such embodiments, the knowledge module is then fine-tuned and trained based on the aligned or coupled knowledge graphs.

In some embodiments, the initial knowledge graph 1420 is first aligned to one or more custom knowledge graphs (e.g., acoustic knowledge graph 1422, enterprise knowledge graph 1424, and/or personalized knowledge graph 1426). The knowledge module 1412 is then trained on the aligned set of knowledge graphs.

In some embodiments, the custom knowledge graph is an acoustic knowledge graph 1422 The acoustic knowledge graph 1422 is derived from the initial knowledge graph (e.g., via a TTS model) or is separately generated/accessed.

In some embodiments, the first knowledge graph (e.g., initial knowledge graph 1420) is obtained as a textual-based knowledge graph. In such embodiments, each entity of the first set of entities being represented by entity description text to describe the concept and meaning of the entities, and each relation of the first set of relations being represented by relation description text to describe each relation between two or more entities.

A second knowledge graph is generated and/or obtained as an acoustic-based knowledge graph (e.g., acoustic knowledge graph 1422). In such instances, each entity of the second set of entities being represented by entity description audio data to describe the concept and meaning of the entities, and each relation of the second set of relations being represented by relation description audio data to describe each relation between two or more entities.

The language module 1414 is pre-trained on a training data set comprising unlabeled or unannotated text data to understand semantic information from text-based transcripts corresponding to the first knowledge graph (e.g., initial knowledge graph 1420). The language module 1414 is also integrated with knowledge module 1412 to form an integrated knowledge-language module 1410. The language module 1414 provides context information 1416 to the knowledge module, and the knowledge module 1412 provides knowledge information 1418 to the language module 1414.

In some embodiments, a knowledge graph is personalized knowledge graph 1426 comprising attributes about a personalized voice, including native language, secondary languages, user gender, voice prosody qualities, voice timbre qualities, or other descriptive features. In some embodiments, the knowledge graph is an acoustic-based personalized knowledge graph. The personalized knowledge graph 1426 includes characteristics about pitch, intonation, speaking rate, speaking style, emotive description, etc. In some instances, the personalized (entity-specific) acoustic knowledge graph comprises entities (e.g., nodes) that are characterized by timbre characteristics of the speaker. Additionally, or alternatively, the personalized acoustic knowledge graph is characterized by the prosody style of the speaker.

In some embodiments, the personalized knowledge graph 1426 is characterized by a user-defined set of entities and user-defined set of relationships, that may or not may not contradict a general public knowledge but is based on the preferences of that particular user. Thus, some methods and systems are provided to generate a first knowledge graph in a first domain and to generate a second knowledge graph as in a second domain, or an entity-specific personalized domain. Subsequently, the knowledge module is adapted to generate knowledge-based entity representations in the second domain based on the first knowledge graph. The integrated knowledge-language module is then trained to perform semantic analysis in the second domain based on personalized knowledge learned from entities and entity relations in the first domain.

In similar manner, the initial knowledge graph 1420 is aligned to an enterprise knowledge graph 1424 which contains knowledge about a particular enterprise or company. For example, in some embodiments, the enterprise corresponds to a specialized vocabulary or vernacular unique to a particular industry. In some embodiments, the enterprise knowledge graph 1424 is an acoustic based knowledge graph (e.g., acoustic KG 1422) which is characterized by an enterprise-specific voice (either human or machine-generated or a machine altered human voice).

In some embodiments, methods and systems are provided for generating the first knowledge graph as a domain-independent knowledge graph and generating the second knowledge graph as an enterprise knowledge graph 1424, wherein the second set of entities and second set of relations correspond to the enterprise-specific domain. The computing system then adapts the knowledge module 1412 to generate enterprise-specific knowledge-based entity representations. Thus, the integrated knowledge-language module is also adapted to perform improved semantic analysis for enterprise-specific electronic language content.

In some instances where a database of knowledge graphs is authorized to be used by a particular user, the user is able to search for and select a particular knowledge graphs based on tags (or other identifiers) matching the query by which the user searches in the database. It should be appreciated that the personalized acoustic knowledge graph is configured to sound as close to the natural speaking voice of the target speaker.

In some embodiments, the acoustic knowledge graph 1422 corresponds to a neural TTS model trained on natural speech data and/or synthesized speech data, wherein the neural TTS model is configured to output speech data in the personalized voice or an enterprise-specific modality.

In some embodiments, methods and systems are provided for aligning dual-acoustic knowledge graphs, wherein the initial knowledge graph 1420 is also an acoustic-based knowledge graph. In such embodiments, the knowledge module 1412 is integrated with a speech module (e.g., speech module 714).

In some embodiments, the computing system obtains a first acoustic knowledge graph comprising a first set of entities and a first set of relations, each relation of the first set of relations describing a relationship between two or more entities included in the first set of entities. The computing system also obtains a second acoustic knowledge graph comprising a second set of entities and a second set of relations, each relation of the second set of relations describing a relationship between two or more entities included in the second set of entities.

The first and second acoustic knowledge graphs are aligned such that a first subset of entities and relations from the first acoustic knowledge graph corresponds to a second subset of entities and relations from the second acoustic knowledge graph.

Subsequently, a knowledge module is trained with the aligned knowledge graphs to generate knowledge-based entity representations. The computing system then generates an integrated knowledge-speech module that is configured to perform semantic analysis for the entities and entity relations included in the second acoustic knowledge graph based on knowledge learned from entities and entity relations in the first acoustic knowledge graph by at least integrating the speech module with the knowledge module.

In some embodiments, the computing system is configured to initialize and operate the integrated knowledge-language module and/or integrated knowledge speech module at/during run-time and perform semantic analysis on audio- and/or text-based speech utterances. Additionally, or alternatively, the computing system is also configured to obtain electronic content comprising speech utterances and perform semantic analysis on the electronic content using the integrated knowledge-language module.

During run-time, the integrated knowledge-language module is configured to perform semantic analysis for entities and entity relations in a second knowledge graph based on knowledge learned from entities and entity relations in a first knowledge graph, and as a result of integrating a language module with a knowledge module that is trained with the alignment of the first knowledge graph and second knowledge graph, and by providing contextual information to the knowledge module from a language module trained to understand semantic information from speech utterances. After performing semantic analysis on the electronic content, the computing system also outputs a translation of the electronic content from the integrated knowledge-language module.

As previously mentioned, the first knowledge graph and second knowledge graph may comprise acoustic-based knowledge graphs, which is useful when the electronic content comprises acoustic-based utterances. Alternatively, the first knowledge graph and the second knowledge graph may also comprise language or textual-based knowledge graphs, which is useful when the electronic content comprises text-based speech utterances.

When performing translations between languages, the computing system translates a first set of speech transcriptions in a first language into a second set of speech transcriptions in a second language using the integrated knowledge-language module. The computing system also performs semantic analysis on the electronic content in a second language based on knowledge learned from entities and entity relations in a first language.

The output of the translation can be further improved by aligning the language module with a desired speech module, particularly when the speech module is pre-trained on a training data set comprising unlabeled or unannotated acoustic data to understand semantic information from speech utterances. The speech module and the language module included in the integrated knowledge-speech module (e.g., integrated knowledge-speech module 1430 will be aligned, in some cases, by projecting the language output embeddings (previously generated by leveraging knowledge graph multi-alignment techniques) and acoustic output embeddings into the same semantic space.

In some embodiments, one or more of the knowledge graphs are image-based knowledge graphs, wherein each entity is represented by image data including a depiction of the target entity and each relation is represented by image data including a depiction of the relationship between two or more target entities. The knowledge graphs are configurable as audio-visual or video-based knowledge graphs, wherein each entity is represented by video data including a recorded or machine generated video depiction of the target entity and each relation between entities is also represented by a corresponding video segment or video data point.

In such embodiments, during knowledge module training, either image and/or video description data is included to give contextual description to each of the knowledge graph nodes. Systems and methods are also able to be adapted such that the knowledge module is integrated with a machine vision module configured to perform image and/or video data analysis, interpretation and understanding.

In additional reference to FIG. 3, in some embodiments, a fine-tuning or refinement training is applied, wherein the integrated knowledge-language module supports either the knowledge graph employed during pre-training (e.g., KG 330 and/or Initial Knowledge Graph 1420) or a novel custom knowledge graph with previously unseen entities. If a custom KG (e.g., Acoustic Knowledge Graph 1422, Enterprise Knowledge Graph 1424, and/or Personalized Knowledge Graph 1426) is used, the entity context embeddings memory (e.g., ECEM 322) is recomputed by the pre-trained language module using the new entity description text corresponding to the custom KG. To increase efficiency, the ECEM 322 is not updated during fine-tuning and/or the relation context embedding memory computed using the pre-trained language module.

In view of the foregoing, it will be appreciated that the disclosed embodiments provide many technical benefits over conventional systems and methods for generating machine learning training data configured to train a machine learning model as an optimized speech module, an integrated knowledge-speech module and/or an integrated knowledge-language module. The disclosed embodiments beneficially improve conventional techniques for leverage knowledge information as part of a language module's training and for leveraging language information as part of a speech module's training.

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-executable instructions 118 of FIG. 1) are physical hardware storage media/devices that exclude transmission media. Computer-readable media that carry computer-executable instructions or computer-readable instructions (e.g., computer-executable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry, or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method for joint training a speech module with a knowledge module for natural language understanding, the method comprising:
    obtaining a first knowledge graph comprising a set of entities and a set of relations between two or more entities included in the set of entities;
    transforming the first knowledge graph into an acoustic knowledge graph, the acoustic knowledge graph comprising a set of acoustic data corresponding to each entity of the set of entities and each relation of the set of relations between entities;
    extracting a first set of acoustic features from the acoustic knowledge graph;
    training a knowledge module on the set of acoustic features to generate knowledge-based entity representations for the acoustic knowledge graph;
    pre-training a speech module on a training data set comprising unlabeled speech data to understand acoustic information from speech transcriptions;
    pre-training a language module on a second training data set comprising unlabeled text-based data, the language module being configured to understand semantic information from speech transcriptions;

aligning the speech module and the language module, the speech module being configured to leverage acoustic information and language information in natural language processing tasks;

obtaining a third training data set comprising paired acoustic data and transcript data;

applying the third training data set to the speech module and language module;

obtaining acoustic output embeddings from the speech module;

obtaining language output embeddings from the language module;

after pre-training the language module, extracting a set of textual features from the first knowledge graph;

training a second knowledge module on the set of textual features; and integrating the second knowledge module with the language module before the language module and speech module are aligned;

aligning the acoustic output embeddings and the language output embeddings to a shared semantic space; and generating an integrated knowledge-speech module to perform semantic analysis on audio data by integrating the knowledge module with the speech module, the integrated knowledge-speech module being generated by providing context information from the speech module to the knowledge module and knowledge information from the knowledge module to the speech module.

2. The method of claim 1, wherein transforming the first knowledge graph into an acoustic knowledge graph comprises:

obtaining electronic content that describes the set of entities and the set of relations between two or more entities included in the set of entities;

extracting a second set of acoustic features from the electronic content;

transcribing the second set of acoustic features from the electronic content into text, the text representing the set of entities and the set of relations included in the first knowledge graph; and training the knowledge module on the text and the second set of acoustic features, the knowledge module being configured to generate entity representations.

3. The method of claim 1, wherein transforming the first knowledge graph into an acoustic knowledge graph comprises:

extracting a set of textual representations for each entity of the set of entities and each relation of the set of relations;

accessing a text-to-speech module;

applying the set of textual representations as input to the text-to-speech module; and obtaining a set of acoustic signals corresponding to the set of textual representations as output from the text-to-speech module, each acoustic signal of the set of acoustic signals representing an entity of the set of entities included in the first knowledge graph or a relation of the set of relations included in the first knowledge graph.

4. The method of claim 1, wherein the knowledge module of the integrated knowledge-speech module comprises a graph attention network and is configured to provide structure-aware entity embeddings for speech modeling.

5. The method of claim 1, wherein the speech module of the integrated knowledge-speech module is further configured to produce acoustic language representations as initial embeddings for acoustic knowledge graph entities and relations.

6. The method of claim 1, wherein integrating the speech module and knowledge module comprises projecting entity and relations output embeddings and language acoustic embeddings into a shared semantic space.

7. The method of claim 1, wherein the speech module of the integrated knowledge-speech module comprises a first speech module and a second speech module.

8. The method of claim 7, wherein the first speech module comprise a first set of transformer layers and the second speech module comprises a second set of transformer layers.

9. The method of claim 7, wherein integrating the speech module and knowledge module further comprises:

obtaining a first set of acoustic language embeddings from the first speech module; and applying the first set of acoustic language embeddings as input to the second speech module and the knowledge module.

10. The method of claim 9, further comprising:

obtaining a first set of acoustic entity embeddings from the knowledge module;

applying the first set of acoustic entity embeddings as input to the second speech module; and obtaining a final representation output embedding from the second speech module based on the first set of acoustic entity embeddings and the first set of acoustic language embeddings, the final representation output embedding including acoustic and knowledge information.

11. The method of claim 1, wherein each entity of the set of entities is represented by entity description audio data to describe a concept and meaning of the entities, and each relation of the set of relations being represented by relation description audio data to describe each relation between two or more entities.

12. The method of claim 1, further comprising:

optimizing the integrated knowledge-speech module by performing one or more following training tasks: entity category prediction, relation type prediction, masked token prediction, or masked entity prediction.

13. A computing system configured for joint training a speech module with a knowledge module for natural language understanding, the computing system comprising:

one or more processors; and one or more hardware storage devices that store computer-executable instructions that are structured to be executed by the one or more processors to cause the computing system to at least:

obtain a first knowledge graph comprising a set of entities and a set of relations between two or more entities included in the set of entities;

transform the first knowledge graph into an acoustic knowledge graph, the acoustic knowledge graph comprising acoustic data corresponding to each entity of the set of entities and each relation of the set of relations between entities;

extract a set of acoustic features from the acoustic knowledge graph;

train a knowledge module on the set of acoustic features to generate knowledge-based entity representations for the acoustic knowledge graph;

pre-train a speech module on a training data set comprising unlabeled speech data to understand acoustic information from speech transcriptions;

pre-train a language module on a second training data set comprising unlabeled text-based data, the language module being configured to understand semantic information from speech transcriptions; and after pre-training the language module, extracting a set of textual features from the first knowledge graph;

training a second knowledge module on the set of textual features;

integrating the second knowledge module with the language module before the language module and speech module are aligned;

align the speech module and the language module, the speech module being configured to leverage acoustic information and language information in natural language processing tasks; and generate an integrated knowledge-speech module to perform semantic analysis on audio data by integrating the knowledge module with the speech module, the integrated knowledge-speech module being trained by providing context information from the speech module to the knowledge module and knowledge information from the knowledge module to the speech module.

14. A computer implemented method for joint training a speech module with a knowledge module for natural language understanding, the method comprising:

obtaining a first knowledge graph comprising a set of entities and a set of relations between two or more entities included in the set of entities;

transforming the first knowledge graph into an acoustic knowledge graph, the acoustic knowledge graph comprising a set of acoustic data corresponding to each entity of the set of entities and each relation of the set of relations between entities;

extracting a first set of acoustic features from the acoustic knowledge graph;

training a knowledge module on the set of acoustic features to generate knowledge-based entity representations for the acoustic knowledge graph;

pre-training a speech module on a training data set comprising unlabeled speech data to understand acoustic information from speech transcriptions, the speech module comprising a first set of transformer layers in a first speech module and a second set of transformer layers in a second speech module; and generating an integrated knowledge-speech module to perform semantic analysis on audio data by integrating the knowledge module with the speech module, the integrated knowledge-speech module being generated by at least obtaining a first set of acoustic language embeddings from the first speech module and applying the first set of acoustic language embeddings as input to the second speech module and the knowledge module, providing context information from the speech module to the knowledge module and knowledge information from the knowledge module to the speech module, obtaining a first set of acoustic entity embeddings from the knowledge module, applying the first set of acoustic entity embeddings as input to the second speech module, and obtaining a final representation output embedding from the second speech module based on the first set of acoustic entity embeddings and the first set of acoustic language embeddings, the final representation output embedding including acoustic and knowledge information.

\* \* \* \* \*